(12) United States Patent
Taniguchi

(10) Patent No.: US 10,471,852 B2
(45) Date of Patent: Nov. 12, 2019

(54) RETURN MECHANISM INCLUDING LOCK LEVER WITH LOCKING PROTRUSION

(71) Applicant: TOYOTA BOSHOKU KABUSHIKI KAISHA, Aichi (JP)

(72) Inventor: Kosuke Taniguchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/912,871

(22) Filed: Mar. 6, 2018

(65) Prior Publication Data

US 2018/0257514 A1 Sep. 13, 2018

(30) Foreign Application Priority Data

Mar. 7, 2017 (JP) .................................. 2017-042758

(51) Int. Cl.
*B60N 2/08* (2006.01)
*B60N 2/07* (2006.01)
*B60N 2/90* (2018.01)

(52) U.S. Cl.
CPC ............ *B60N 2/085* (2013.01); *B60N 2/0705* (2013.01); *B60N 2/0818* (2013.01); *B60N 2/0825* (2013.01); *B60N 2002/952* (2018.02)

(58) Field of Classification Search
CPC ...... B60N 2/085; B60N 2/0705; B60N 2/0825
USPC ............................... 296/65.13, 65.14, 65.15
See application file for complete search history.

(56) References Cited

U.S. PATENT DOCUMENTS

| 6,631,952 B1* | 10/2003 | Liebetrau ............ | B60N 2/0806 297/341 |
| 2003/0122412 A1 | 7/2003 | Niimi et al. | |
| 2004/0051361 A1* | 3/2004 | Rausch ............... | B60N 2/0705 297/341 |
| 2006/0108492 A1* | 5/2006 | Kojima ............... | B60N 2/0715 248/429 |

FOREIGN PATENT DOCUMENTS

JP 2003-182415 7/2003

* cited by examiner

*Primary Examiner* — Joseph D. Pape
(74) *Attorney, Agent, or Firm* — Greenblum & Bernstein, P.L.C.

(57) ABSTRACT

Provided is a sliding device for a vehicle seat. The device includes a fixed rail, a movable rail, a lock portion, an operating lever, a first locking protrusion, and a lock lever. When a first contact surface among side faces of the first locking protrusion and a second contact surface among side faces of a second locking protrusion of the lock lever are in contact with each other, the operating lever is retained in one of a first position or a second position, and when a protruding-direction end of the first locking protrusion and a protruding-direction end of the second locking protrusion are in contact with each other, the operating lever is retained in the other of the first position or the second position.

12 Claims, 19 Drawing Sheets

RETURN MECHANISM INCLUDING LOCK LEVER WITH LOCKING PROTRUSION

CROSS-REFERENCE TO RELATED APPLICATIONS

This application claims the benefit of Japanese Patent Application No. 2017-042758 filed on Mar. 7, 2017 with the Japan Patent Office, the disclosure of which is incorporated herein by reference.

BACKGROUND

The present disclosure relates to a sliding device that supports a vehicle seat in a slidable manner.

For example, a sliding device disclosed in Japanese Unexamined Patent Application Publication No. 2003-182415 comprises a "walk-in mechanism" for performing a "walk-in sliding function". Such a function is a "function of enabling the entire vehicle seat to slide along a seat front-rear axis in association with an operation to fold down a seatback toward a seat front side".

The above-described sliding device comprises a fixed rail, a movable rail, a lock member, an operating lever, and so on. The lock member restricts sliding of the movable rail. The operating lever is a lever having a "sickle-like" shape that is rotationally displaced to thereby displace the lock member.

SUMMARY

A direction of rotation of the operating lever is different in some cases depending on each vehicle seat. For example, in some vehicle seats, an operating lever rotating clockwise has to be used, or an operating lever rotating counterclockwise has to be used. In this case, a sliding device dedicated to clockwise rotation or dedicated to counterclockwise rotation is difficult to apply to various vehicle seats.

In the present disclosure, it is desirable to provide a sliding device that is easily applicable to either clockwise rotation or counterclockwise rotation.

In the present disclosure, a sliding device comprises: a lock portion that is displaceable between a locking position restricting sliding of a movable rail and a non-locking position allowing the movable rail to slide; an operating lever that displaces the lock portion, the operating lever being rotationally displaced between a first position placing the lock portion in the non-locking position and a second position placing the lock portion in the locking position; a first locking protrusion protruding in a direction substantially perpendicular to a rotation center axis of the operating lever, the first locking protrusion being rotationally displaced about the rotation center axis simultaneously with the operating lever; and a lock lever comprising a rotating shaft parallel to the rotation center axis of the operating lever, the lock lever comprising a second locking protrusion at a position radially offset from the rotating shaft, wherein the second locking protrusion protrudes substantially in a direction intersecting with the radial axis and with the rotation center axis and being rotationally displaced about an axis of the rotating shaft.

The sliding device is configured such that, when a first contact surface and a second contact surface are in contact with each other, the operating lever is retained in one of the first position or the second position, and such that, when a protruding-direction end of the first locking protrusion and a protruding-direction end of the second locking protrusion are in contact with each other, the operating lever is retained in the other of the first position or the second position.

The first contact surface is a side face on one side in operating directions among side faces of the first locking protrusion. The second contact surface is a side face on one side along the radial axis among side faces of the second locking protrusion. The operating directions are directions parallel to rotating directions of the operating lever.

This enables the second locking protrusion to come closer to the first locking protrusion along an axis substantially parallel to a protruding direction of the first locking protrusion. In other words, the second contact surface is in sliding contact with the first contact surface along the axis substantially parallel to the protruding direction, so that the second locking protrusion is locked with respect to the first locking protrusion.

Thus, the second locking protrusion can contact the first locking protrusion either from a clockwise direction or from a counterclockwise direction and be locked with respect to the first locking protrusion. In other words, in whichever direction, clockwise or counterclockwise, the operating lever rotates, the first contact surface and the second contact surface contact each other.

Accordingly, in whichever direction the operating lever rotates, the first locking protrusion can be locked with respect to the second locking protrusion; thus, the operating lever can be retained in one of the first position or the second position regardless of the direction of rotation of the operating lever.

Similarly, in whichever direction the operating lever rotates, the protruding-direction end of the first locking protrusion and the protruding-direction end of the second locking protrusion can contact each other; thus, the operating lever can be retained in the other of the first position or the second position regardless of the direction of rotation of the operating lever.

The one side in the operating directions is intended to mean one of a clockwise direction or a counterclockwise direction. The one side along the radial axis is intended to mean one of a direction getting closer to the rotating shaft or a direction spaced apart from the rotating shaft along the radial axis.

The present disclosure may be configured as below. It is desirable that the second contact surface be a curved surface that is curved substantially along an arc centered on a rotation center axis of the rotating shaft. This enables locking between the first locking protrusion and the second locking protrusion to be a smooth operation.

It is desirable that the protruding-direction end of the first locking protrusion be a curved surface that is curved substantially along an arc centered on the rotation center axis of the operating lever. This makes it possible to permit rotational displacement of the operating lever while retaining the operating lever in the other of the first position or the second position.

It is desirable that a part of the protruding-direction end of the second locking protrusion in contact with the protruding-direction end of the first locking protrusion substantially correspond to a virtual tangential plane with respect to the protruding-direction end of the first locking protrusion at the part.

This makes it possible to inhibit unnecessary rotational displacement of the first locking protrusion when the operating lever is rotationally displaced while retaining the operating lever in the other of the first position or the second position.

BRIEF DESCRIPTION OF THE DRAWINGS

An embodiment of the present disclosure will be described below by way of example with reference to the accompanying drawings, in which.

DETAILED DESCRIPTION OF THE PREFERRED EMBODIMENTS

Figure 1:
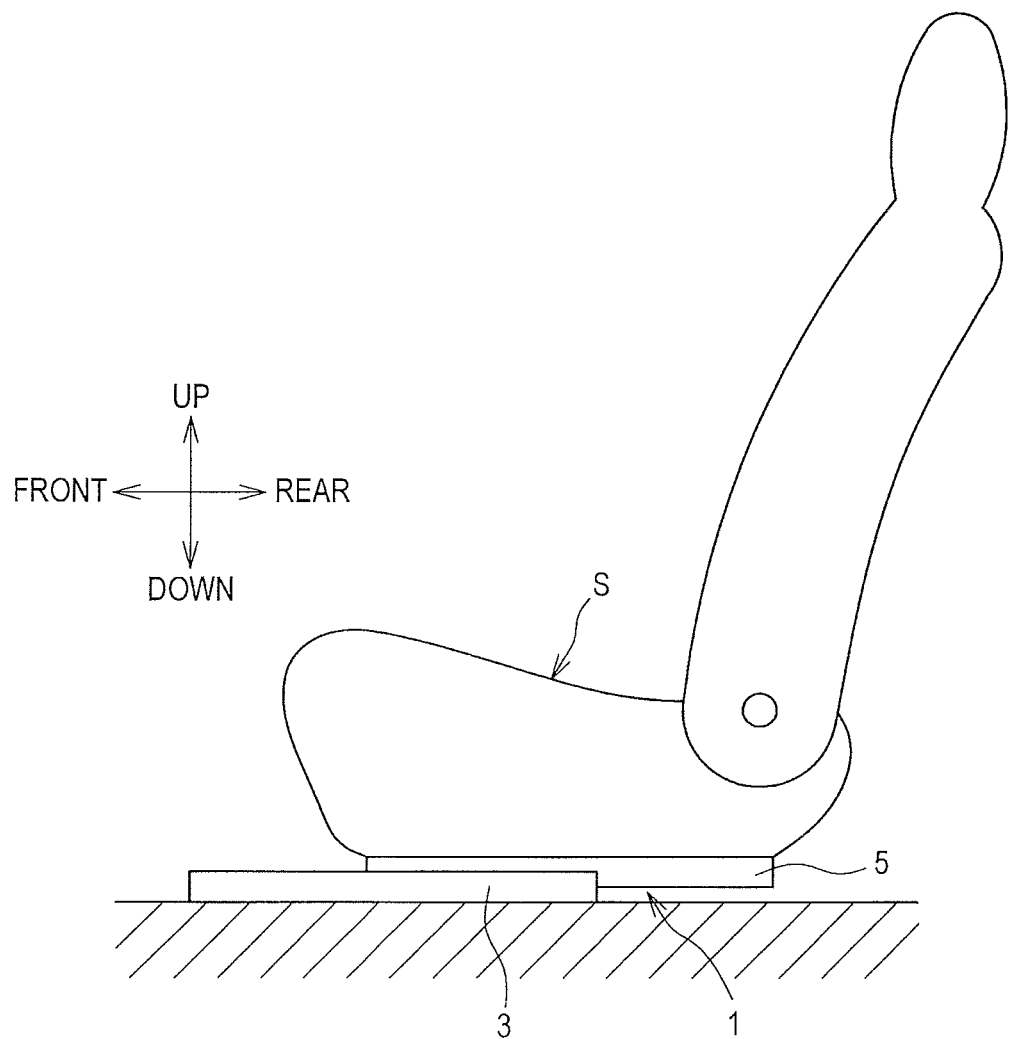
FIG. 1 is a schematic view of a vehicle seat.

"Embodiments" to be described below are example embodiments within the technical scope of the present disclosure. In other words, invention-specifying-matters and so on recited in the accompanying claims are not limited to specific configurations, structures, and the like, shown in the below-described embodiments.

Arrows indicating directions shown in the drawings are provided for easy understanding of mutual relationships between the drawings. The present disclosure is not limited by the directions shown in the drawings.

A longitudinal direction refers to a front-rear direction. A width or transverse direction refers to a left-right direction. A vertical or height direction refers to an up-down direction. These directions refer to a user sitting in a seat.

As shown in FIG. 1, a sliding device 1 of the present embodiment is provided to a vertical axis lower end of a seat S.

The sliding device 1 of the present embodiment is provided to the seat S at each side thereof along a width axis thereof. Specifically, the seat S is mounted onto a vehicle via the two sliding devices 1. The width axis of the seat S may correspond to a vehicle width axis, that is, a vehicle left-right axis. Alternatively, the seat S may be mounted in any orientation with respect to the vehicle, and may even be rotatable around a vertical axis.

1. Overview of Sliding Device

Figure 2:
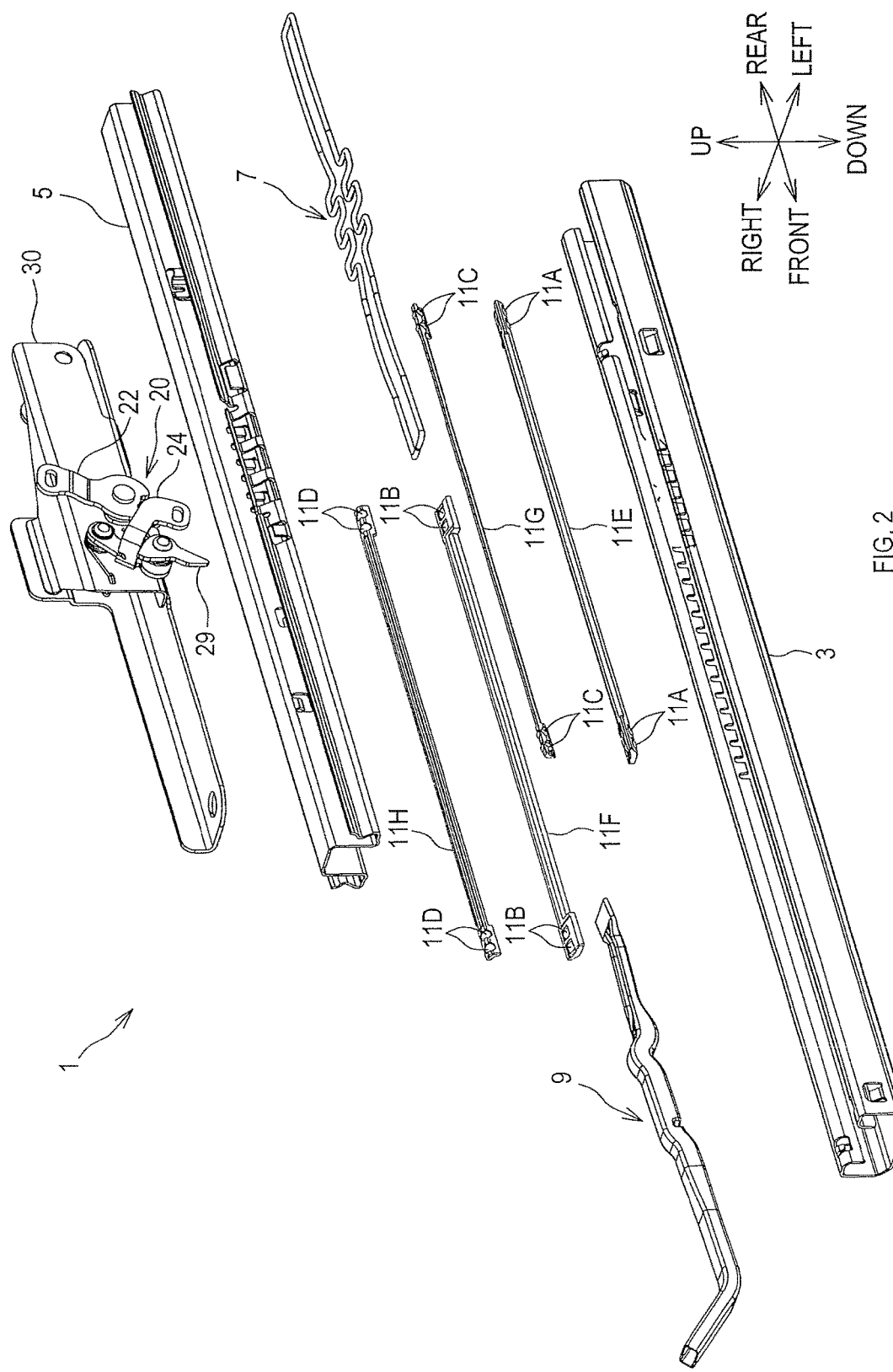
FIG. 2 is an exploded perspective view of a sliding device.

The sliding device 1 will be described below. As shown in FIG. 2, the sliding device 1 comprises a fixed rail 3, a movable rail 5, a lock spring 7, a releasing member 9, and a return mechanism 20. As shown in FIG. 1, the fixed rail 3 is fixed to a floor panel or the like of the vehicle such that a longitudinal axis of the fixed rail 3 corresponds to a vehicle front-rear axis (a seat front-rear axis).

Figure 3:
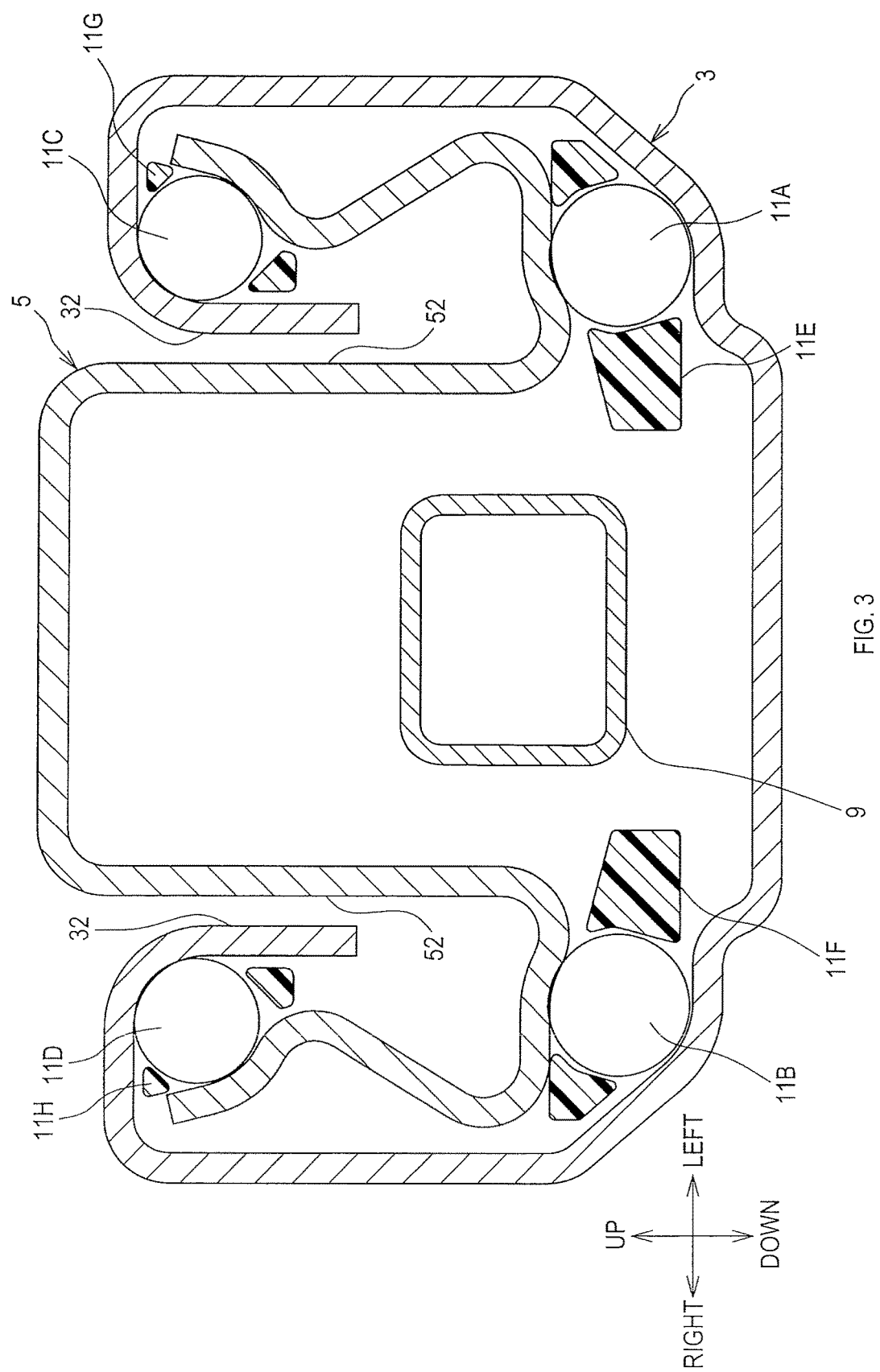
FIG. 3 is a sectional view of the sliding device.

The movable rail 5 supports the seat S, and is slidable with respect to the fixed rail 3. As shown in FIG. 3, the movable rail 5 is supported by the fixed rail 3 via rolling elements 11A to 11D.

The rolling elements 11A to 11D each are in rolling contact with the fixed rail 3 and the movable rail 5. This allows the movable rail 5 to be slidingly displaced along the longitudinal axis (a front-rear axis) of the fixed rail 3 while displacement of the movable rail 5 with respect to the fixed rail 3 along a seat width axis (a left-right axis, hereinafter simply referred to as a width axis) is restricted.

The rolling elements 11A to 11D are spheres, such as steel balls. As shown in FIG. 2, each of the rolling elements 11A to 11D, which are retained by retainers 11E to 11H, respectively, is two in number for each longitudinal end thereof.

The lock spring 7 prevents the movable rail 5 from sliding with respect to the fixed rail 3. The releasing member 9 releases the lock spring 7. The releasing member 9 is operated directly or indirectly by a passenger or other person The return mechanism 20 is a mechanism to switch a state of the sliding device 1 between a "slidable state" (a released state, or an unlocked state) and an "unslidable state" (an engaged state or a locked state). The "slidable state" is a state in which, when the movable rail 5 is allowed to slide with respect to the fixed rail 3 by a "walk-in sliding function", such a state can be maintained (see FIG. 10).

Figure 11:
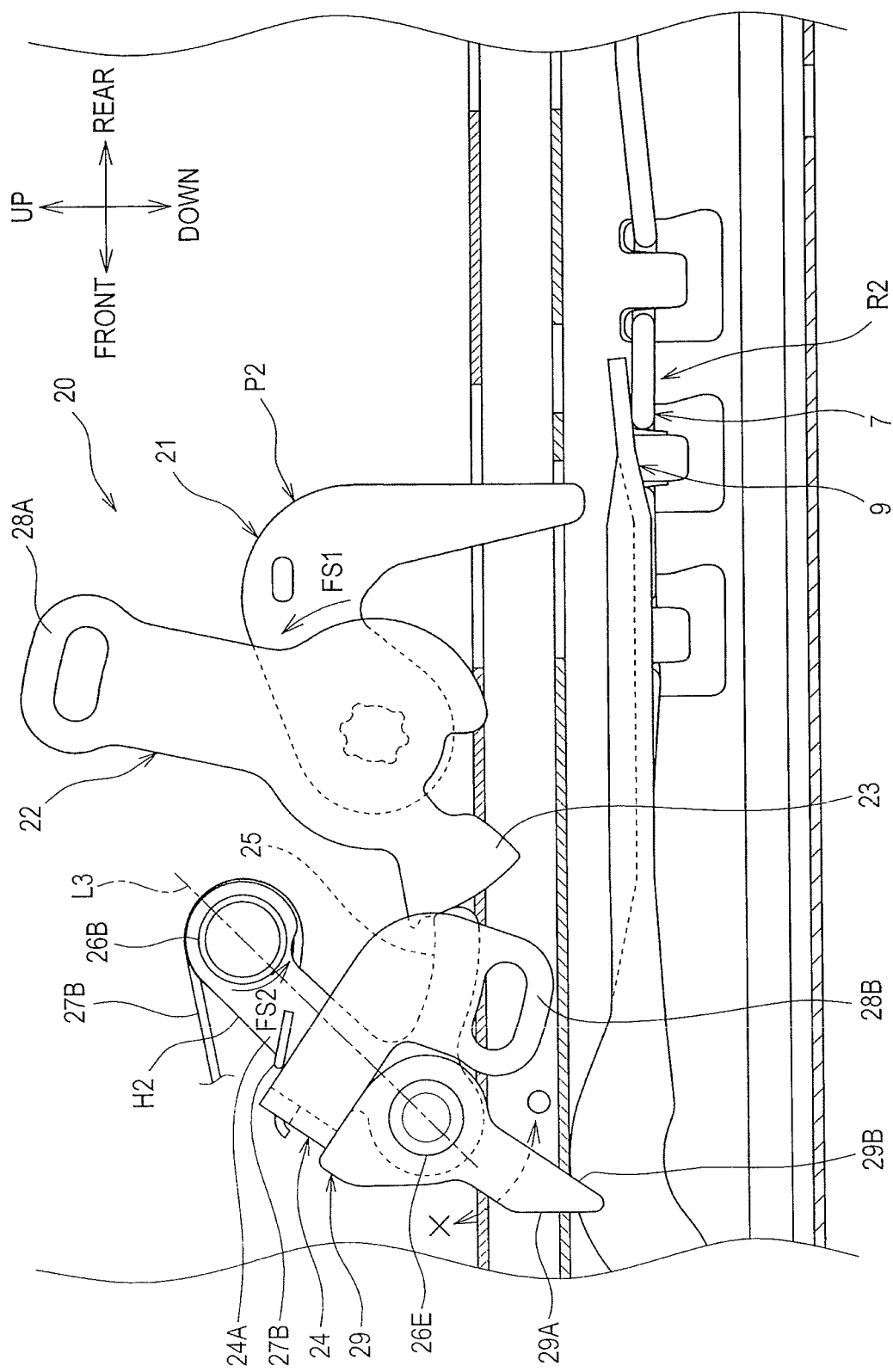
FIG. 11 is a diagram explaining operation of the return mechanism, showing a locking position.

The "unslidable state" is a state in which sliding of the movable rail 5 is prohibited (see FIG. 11). The "released state" permits sliding. After establishment of the state in which sliding of the movable rail 5 is permitted by the "walk-in sliding function", the movable rail 5 cannot slide in a specified position.

2. Lock Mechanism 2.1 Overview of Lock Mechanism

Figure 4:
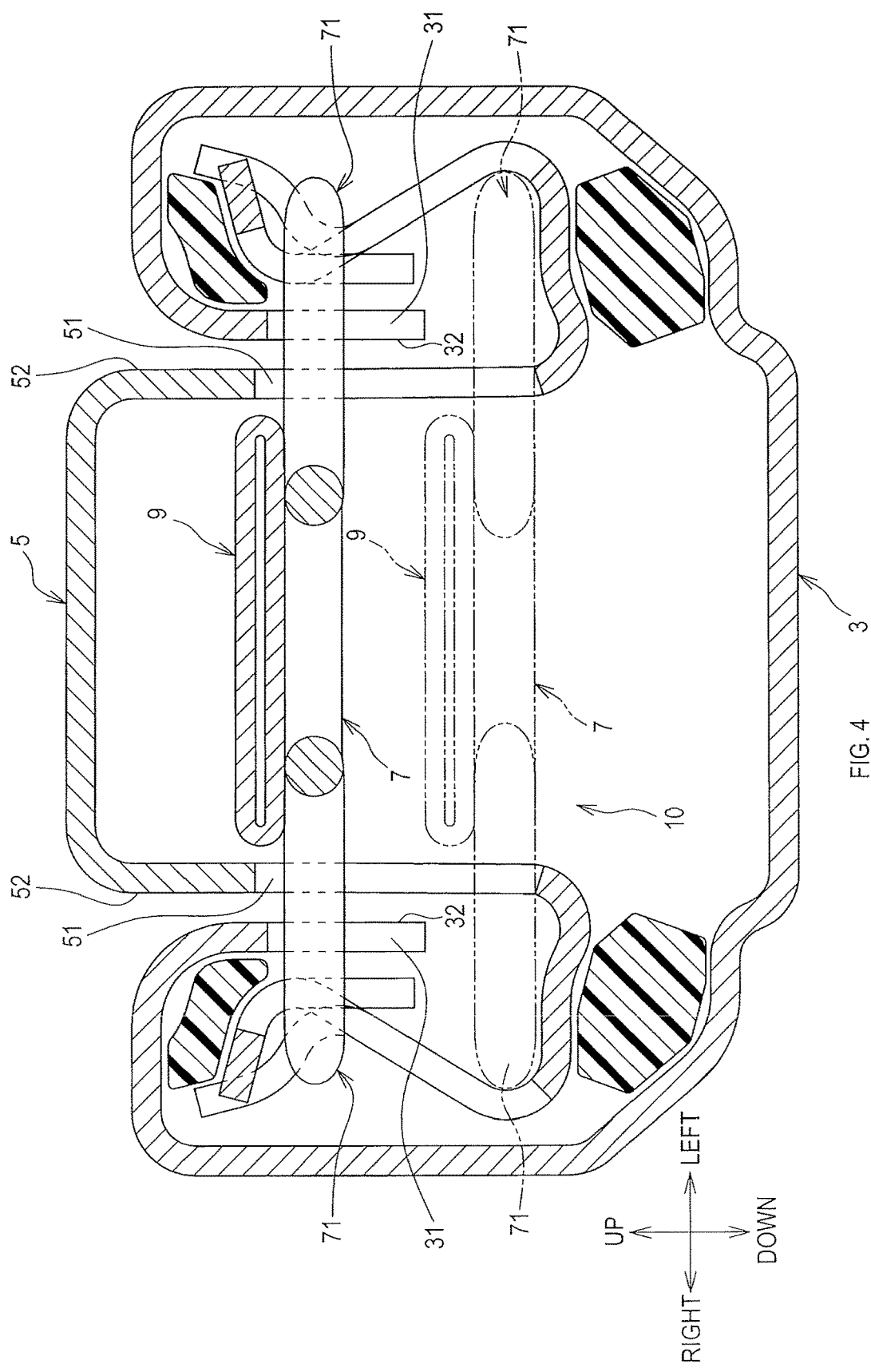
FIG. 4 is a sectional view of the sliding device.

The sliding device 1 comprises a lock mechanism 10 (see FIG. 4). The lock mechanism 10 prohibits sliding displacement of the movable rail 5. As shown in FIG. 4, the lock mechanism 10 comprises the lock spring 7 and the releasing member 9.

Figure 5:
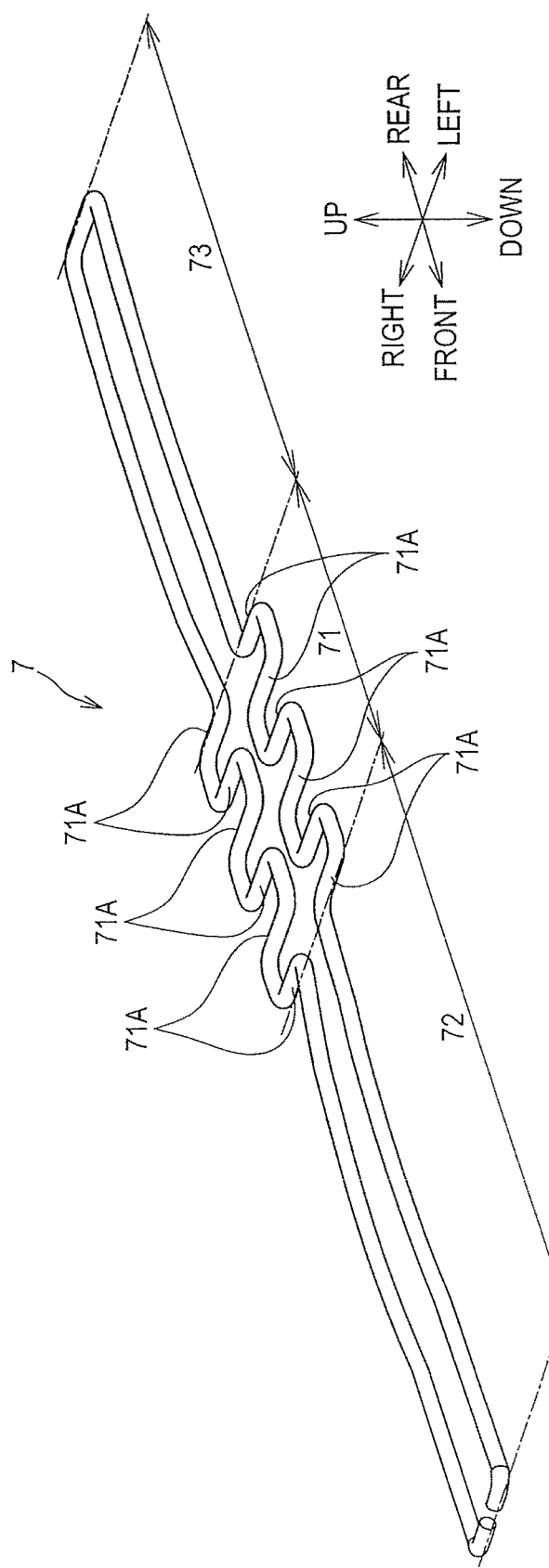
FIG. 5 is a perspective view of a lock spring.

FIG. 5 shows that the lock spring 7 comprises a lock portion 71, a first spring portion 72 and a second spring portion 73. The lock portion 71 is simultaneously engaged with the fixed rail 3 and the movable rail 5 in a manner caught in the fixed rail 3 and the movable rail 5.

The first spring portion 72 and the second spring portion 73 are elastically deformable, and support the lock portion 71 such that the lock portion 71 is displaceable between a locking position R2 (in a locked state) and a non-locking position R1 (in a released state).

Figure 6:
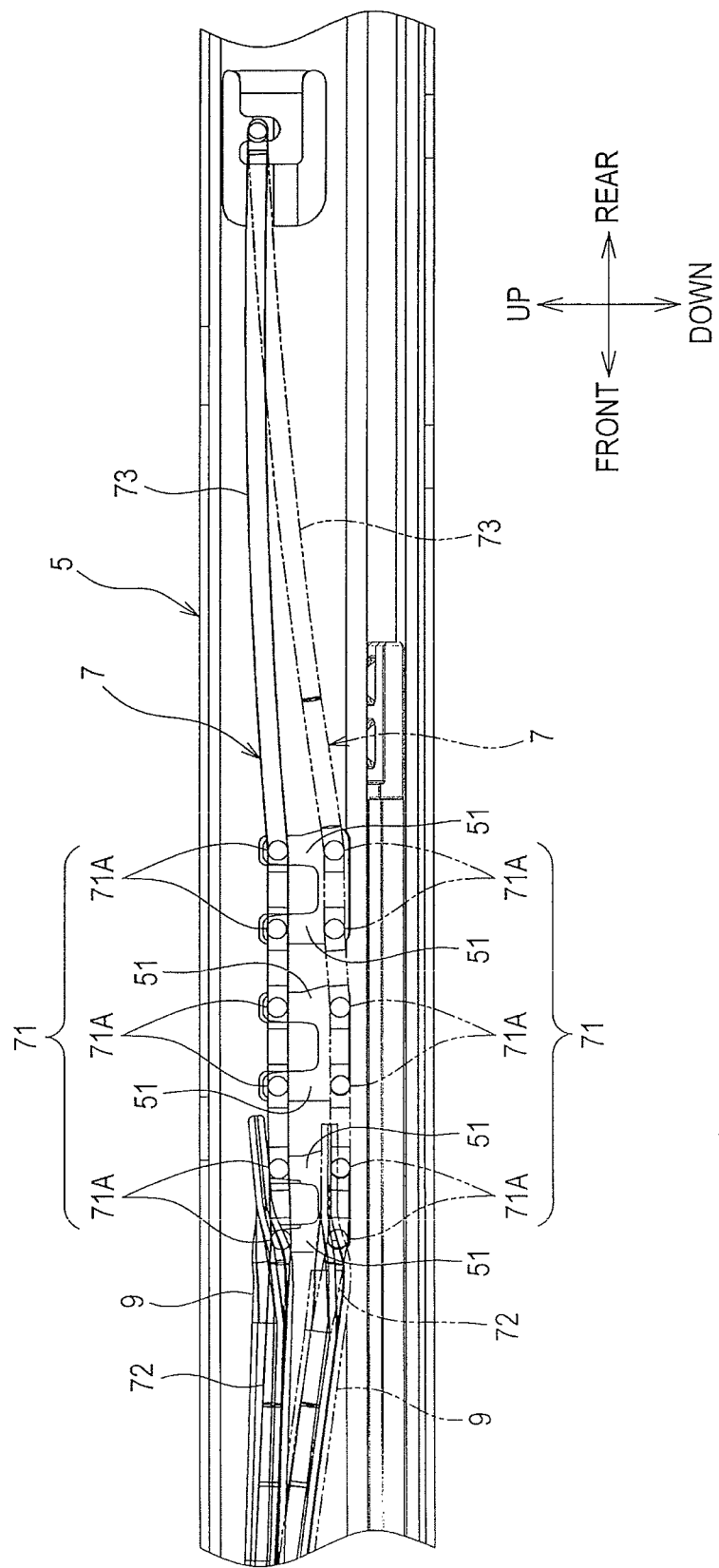
FIG. 6 is a diagram explaining operation of a lock mechanism.

The first spring portion 72 and the second spring portion 73 retain the lock portion 71 in the locking position R2 (in a position shown by solid lines in FIG. 6). In the locking position R2, the lock portion 71 is simultaneously engaged (locked) with the fixed rail 3 and the movable rail 5; thus, the movable rail 5 is prohibited from sliding with respect to the fixed rail 3.

Upon operation of the releasing member 9 by a passenger or other person, such an operation force causes elastic deformation of the first spring portion 72 and the second spring portion 73, to thereby displace the lock portion 71 down to the non-locking position R1 as shown by two-dot chain lines in FIG. 6. Thus, the state in which the lock portion 71 is engaged with the fixed rail 3 and the movable rail 5 is eliminated.

When the operation force exerted on the releasing member 9 is no longer exerted, the first spring portion 72 and the second spring portion 73 are restored. This causes the lock portion 71 to return to the locking position R2 (the position shown by solid lines in FIG. 6).

The lock spring 7 of the present embodiment is an article formed by bending a linear metal material, such as a spring steel material, having toughness. The first spring portion 72, the lock portion 71, and the second spring portion 73 are one piece of metal.

2.2 Structure in which Lock Portion is Engaged with Fixed Rail and Movable Rail

As shown in FIGS. 3 to 5, the lock portion 71 (the lock spring 7), the fixed rail 3, and the movable rail 5 are configured to be symmetric along the width axis. An explanation will be given below of an engagement structure on one end side along the width axis (on the right end side, in the present embodiment).

<Fixed Rail and Movable Rail>

Figure 7:
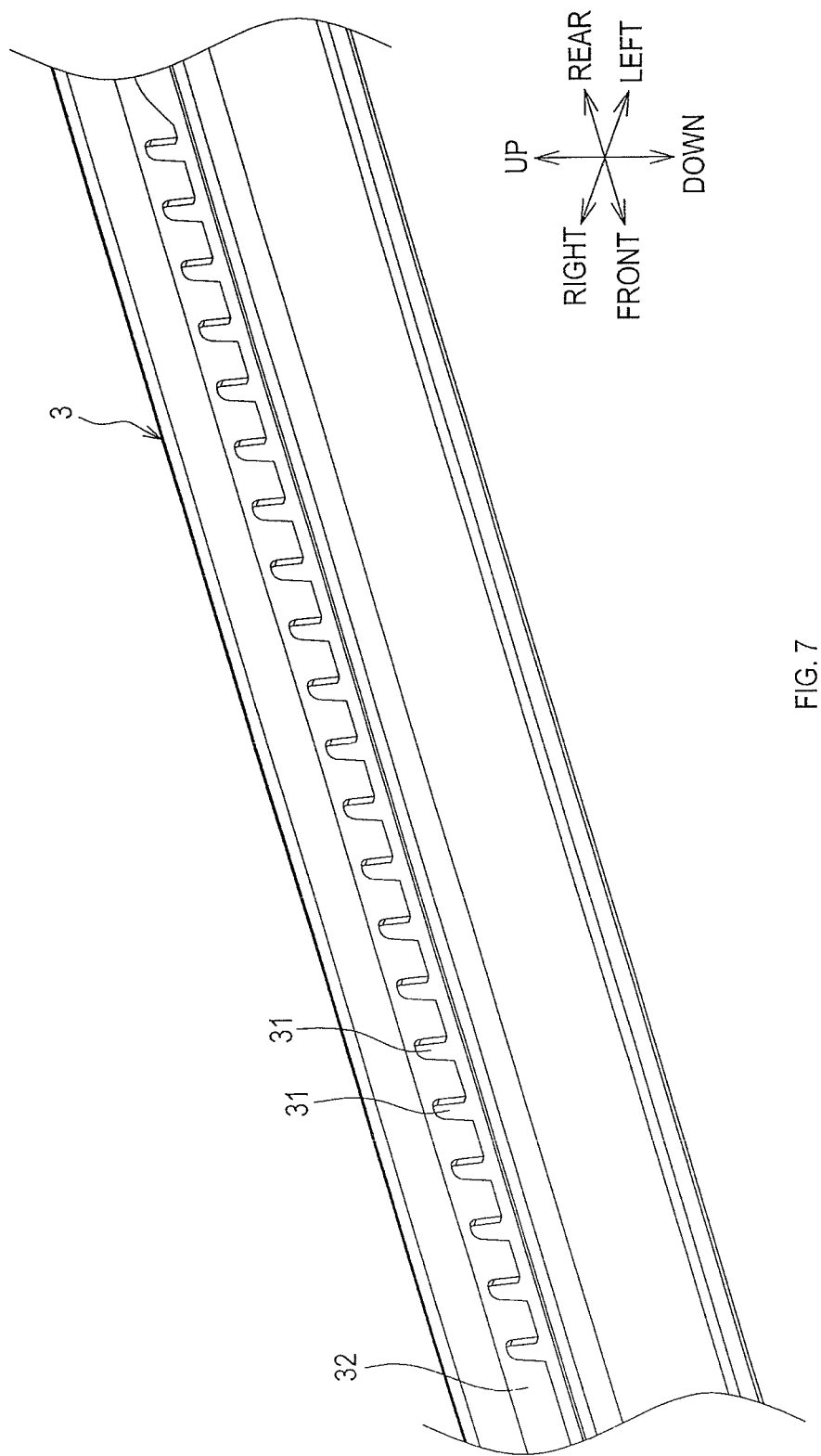
FIG. 7 is a partially enlarged perspective view of a fixed rail.

As shown in FIG. 7, the fixed rail 3 comprises a plate 32 facing the movable rail 5, and indentations 31 are arranged in the plate 32. Each indentation 31 is indented along an axis substantially perpendicular to the longitudinal axis of the fixed rail 3 (along an up-down axis, in the present embodiment).

The indentations 31 are arranged side by side along the longitudinal axis in a longitudinal-axis middle part of the fixed rail 3, see FIG. 2. The longitudinal-axis middle part is a part between one longitudinal-axis end and the other longitudinal-axis end.

Figure 8:
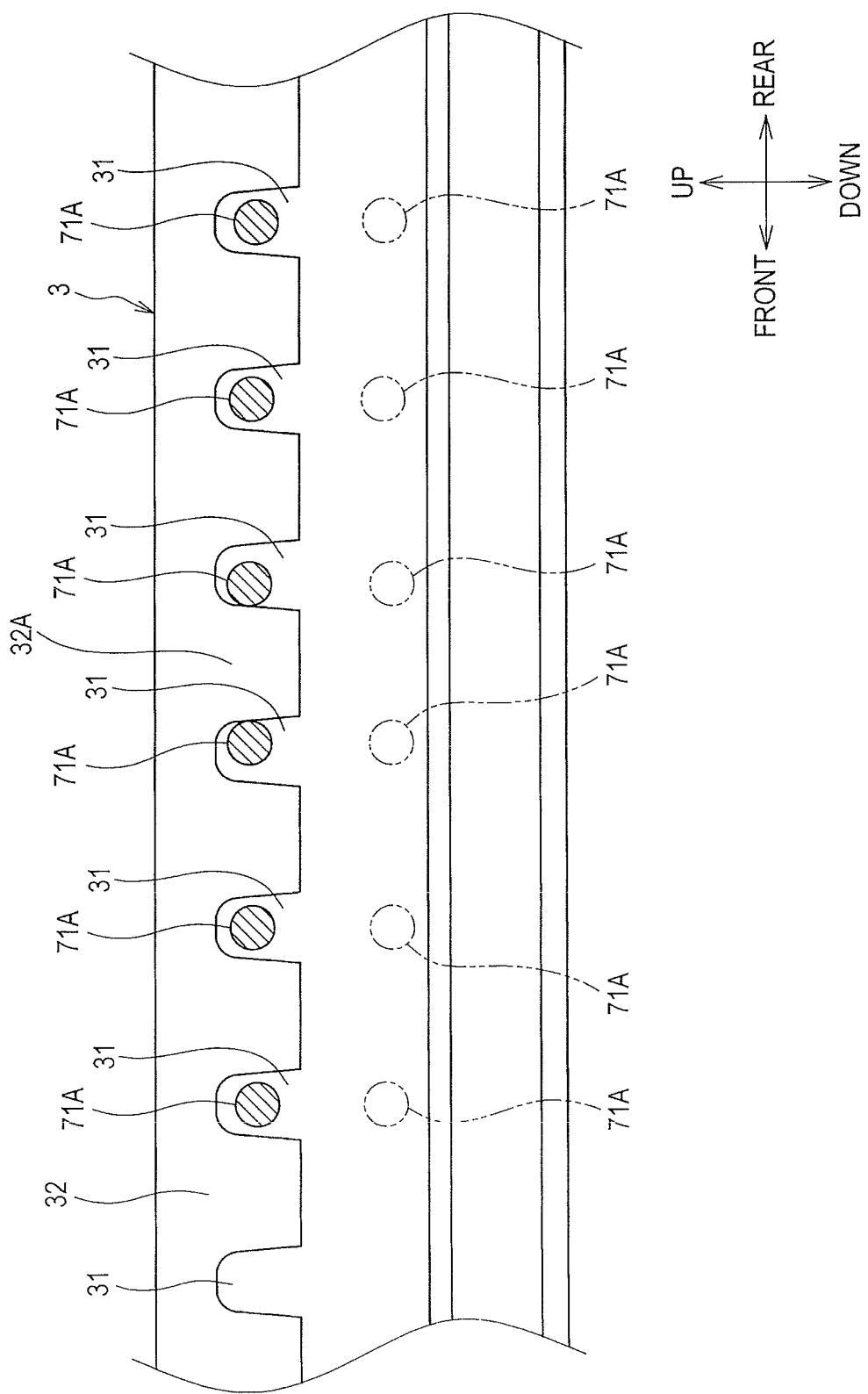
FIG. 8 is an enlarged view of an indented part.

As shown in FIG. 8, each indentation 31 is formed in a substantially U shape so as to penetrate the fixed rail 3 along the width axis (the left-right axis).

As shown in FIG. 4, the movable rail 5 has a plate 52, and through-holes 51 are arranged in the plate 52. Each through-hole 51 is a hole penetrating through the plate 52. A penetrating axis of each through-hole 51 is directed substantially perpendicular to an indentation axis of each indentation 31 and to the longitudinal axis. The plate 52 is a portion in the movable rail 5 that faces the indentations 31 (the plate 32).

<Lock Portion>

Figure 9:
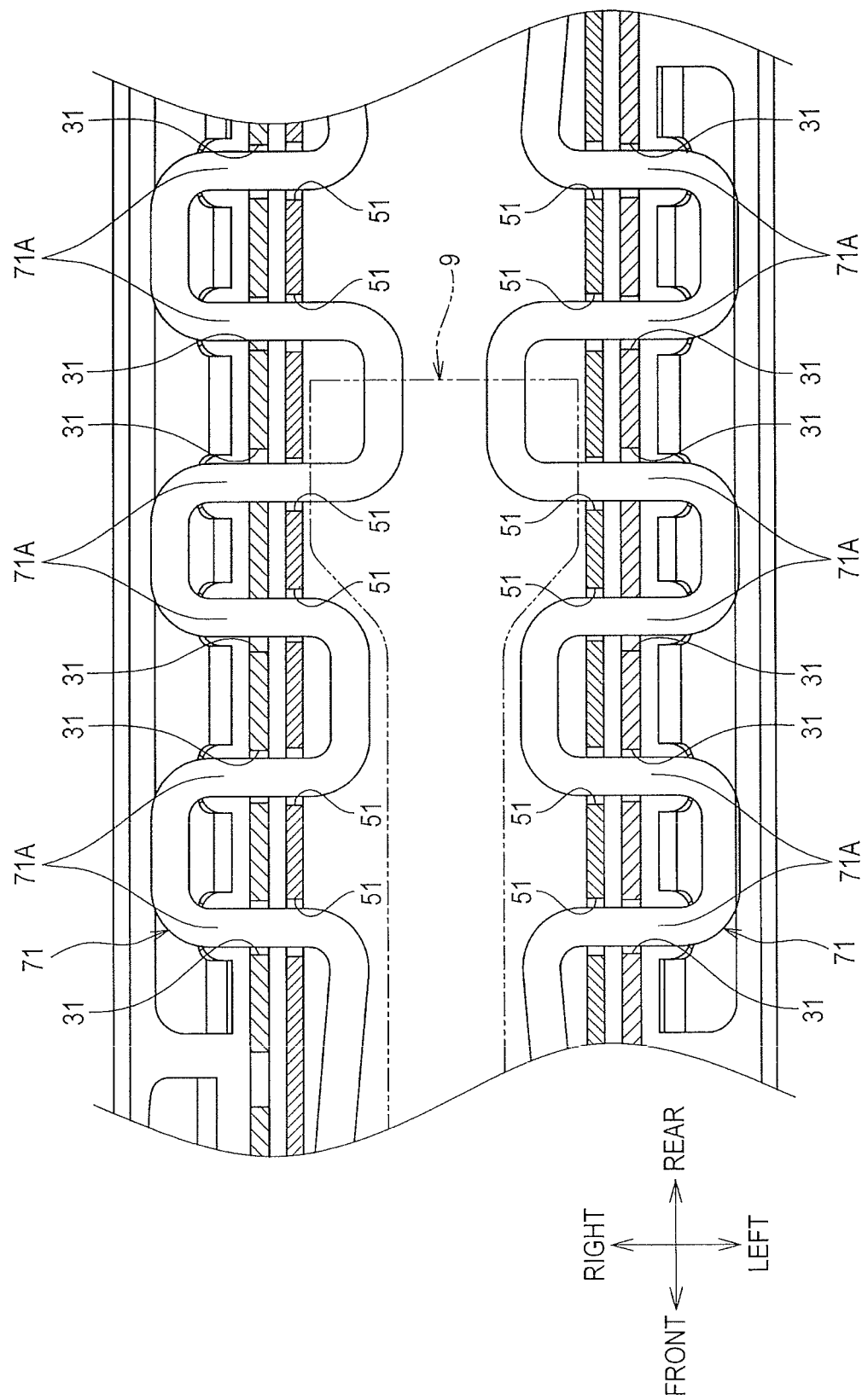
FIG. 9 is an explanatory diagram showing a locking state of the lock mechanism.

As shown in FIG. 9, the lock portion 71 comprises latches 71A. Each latch 71A is a rod-like member that gets through the corresponding through-hole 51 and gets through any one of the indentations 31.

Each latch 71A is displaced along the indentation axis of the indentation 31, thereby being displaceable between the locking position R2 (a position shown by solid lines in FIG. 8) in which each latch 71A is engaged with the corresponding indentation 31 and the non-locking position R1 (a position shown by two-dot chain lines in FIG. 8) displaced from the locked position.

In other words, each latch 71A is displaceable, in the through-holes 51 each having an elongated shape, between: a position at one extending-axis end side (an upper end side, in the present embodiment) corresponding to the locking position R2; and a position at the other extending-axis end side (a lower end side, in the present embodiment) corresponding to the non-locking position R1.

3. Return Mechanism 3.1 Structure of Return Mechanism

Specifically, the return mechanism 20 provides a first function of switching the state of the sliding device 1 to the slidable state (see FIG. 10) and a second function of switching the state of the sliding device 1 to the unslidable state (see FIG. 11). When performing the first function, the return mechanism 20 positions the lock portion 71 in the non-locking position R1. When performing the second function, the return mechanism 20 permits the lock portion 71 to return to the locking position R2.

Figure 12:
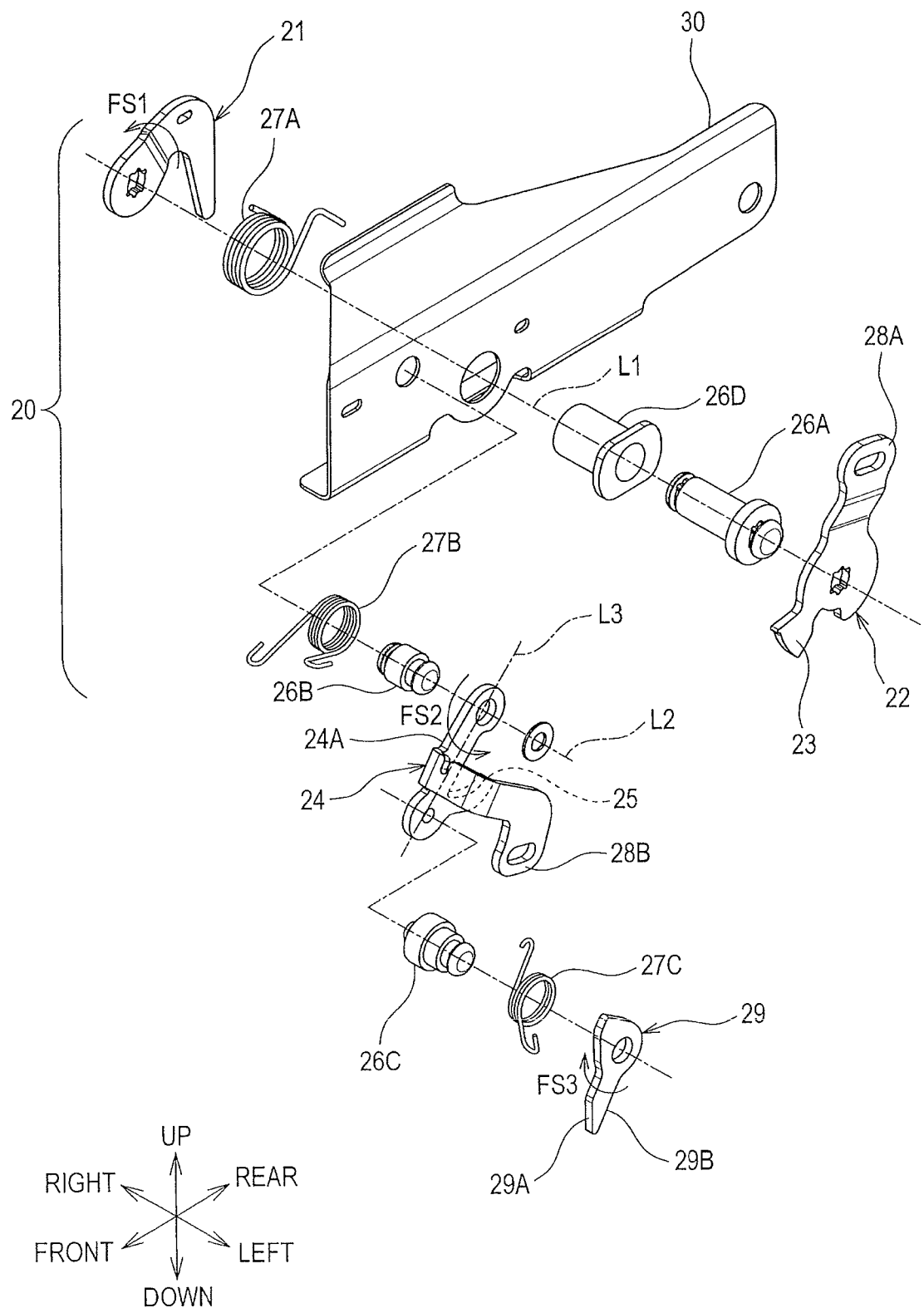
FIG. 12 is an exploded perspective view of the return mechanism.

As shown in FIG. 12, the return mechanism 20 comprises a first operating lever 21, a second operating lever 22, and a lock lever 24. The respective levers 21, 22, and 24 are mounted to a base member 30.

The first operating lever 21 indirectly displaces the lock portion 71. The first operating lever 21 is a sickle-shaped member rotationally displaced between a first position P1 (see FIG. 10) placing the lock portion 71 in the non-locking position R1, and a second position P2 (see FIG. 11) permitting the lock portion 71 to return to the locking position R2.

Figure 10:
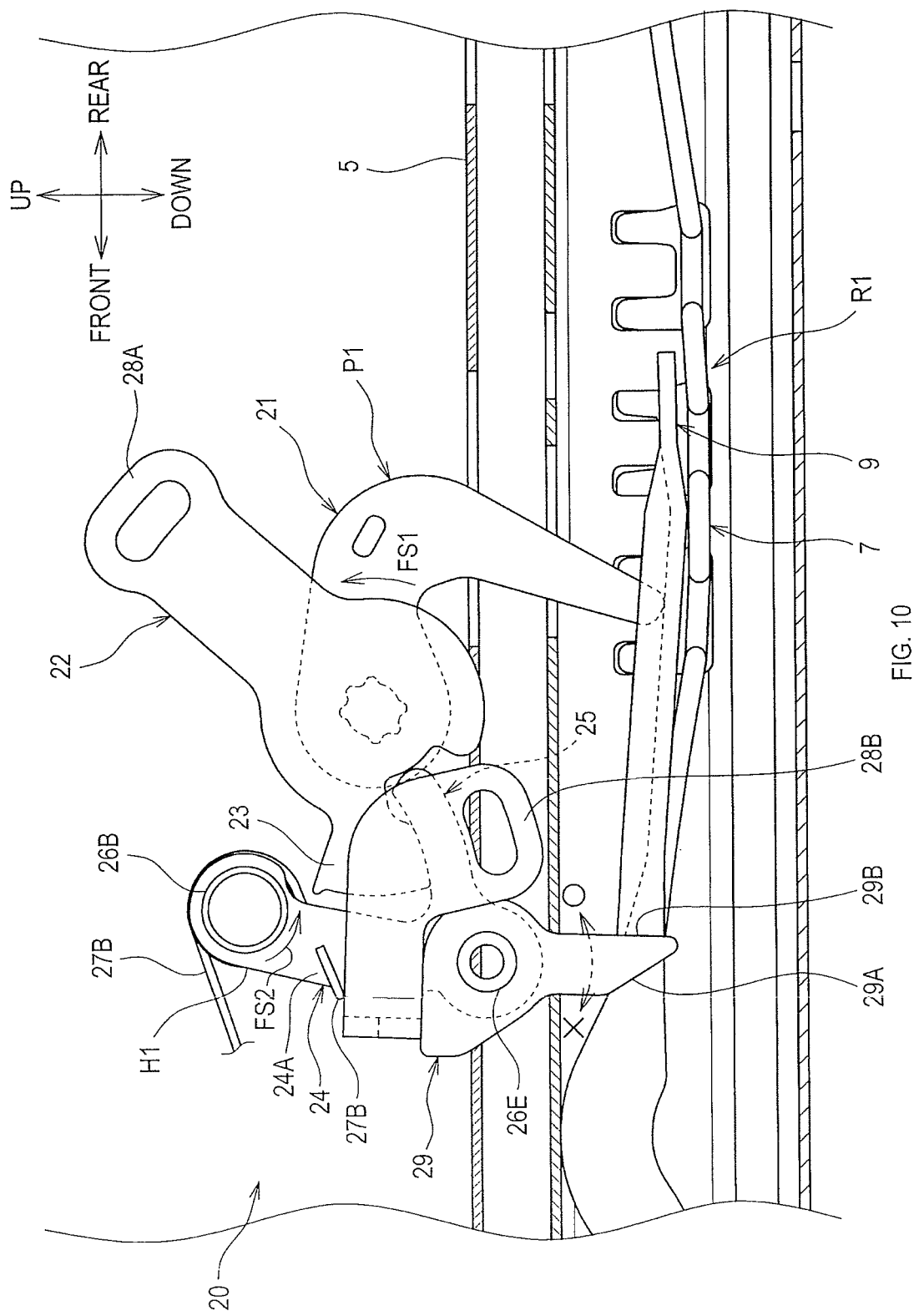
FIG. 10 is a diagram explaining operation of a return mechanism, showing a non-locking position.

The first operating lever 21 of the present embodiment displaces the lock portion 71 indirectly via the releasing member 9. Specifically, as shown in FIG. 10, the first operating lever 21 in the first position P1 is pressing a leading end side of the releasing member 9 toward the non-locking position R1.

The first operating lever 21 in the second position P2 is, for example, spaced apart from the releasing member 9 (see FIG. 11). Thus, the force to press the releasing member 9 toward the non-locking position R1 is no longer exerted, to thereby restore the first spring portion 72 and the second spring portion 73. As a result, the lock portion 71 returns to the locking position R2.

As shown in FIG. 12, the second operating lever 22 is a rotary lever that is arranged on a rotation center axis L1 (hereinafter referred to as a first axis L1) of the first operating lever 21, and that is rotationally displaced integrally with the first operating lever 21.

The first operating lever 21 and the second operating lever 22 are integrated together via a first rotating shaft 26A.

Specifically, the first rotating shaft 26A comprises, at axial both ends thereof, rotation preventing parts, such as a spline and a serration. The first operating lever 21 and the second operating lever 22 each comprise an insertion section for meshed engagement with the corresponding rotation preventing part.

Each axial end of the first rotating shaft 26A is caulked in a state where a rotation preventing part thereof is inserted into and engaged with the corresponding insertion section. This allows integral rotation of the first operating lever 21 and the second operating lever 22.

The first rotating shaft 26A is mounted to the base member 30 via a sleeve 26D of a cylindrical shape constituting a bearing. That is, the sleeve 26D is fixed to the base member 30. The first rotating shaft 26A penetrates the base member 30 from one side to the other side thereof through the sleeve 26D.

A first spring 27A exerts a first elastic force FS1 that rotates the first operating lever 21 in a direction directed from the first position P1 (released) to the second position P2 (locked). The first spring 27A of the present embodiment is configured with a helical torsion coil spring, one end of which is anchored to the first operating lever 21 and the other end is anchored to the base member 30.

The second operating lever 22 comprises a first locking protrusion 23 protruding in a direction substantially perpendicular to the first axis L1. Thus, the first locking protrusion 23 is rotationally displaced about the first axis L1 in association with the first operating lever 21.

The second operating lever 22 comprises, at a left-right position different from the first locking protrusion 23, a first coupler 28A to which a first control cable (not shown) is coupled. The first control cable is to be operated by a user.

When the first control cable is pulled, the first operating lever 21 rotates in a direction directed from the second position P2 (locked) to the first position P1 (released), and an amount of elastic deformation of the first spring 27A is increased. This causes the first spring 27A to exert the first elastic force FS1.

Figure 13:
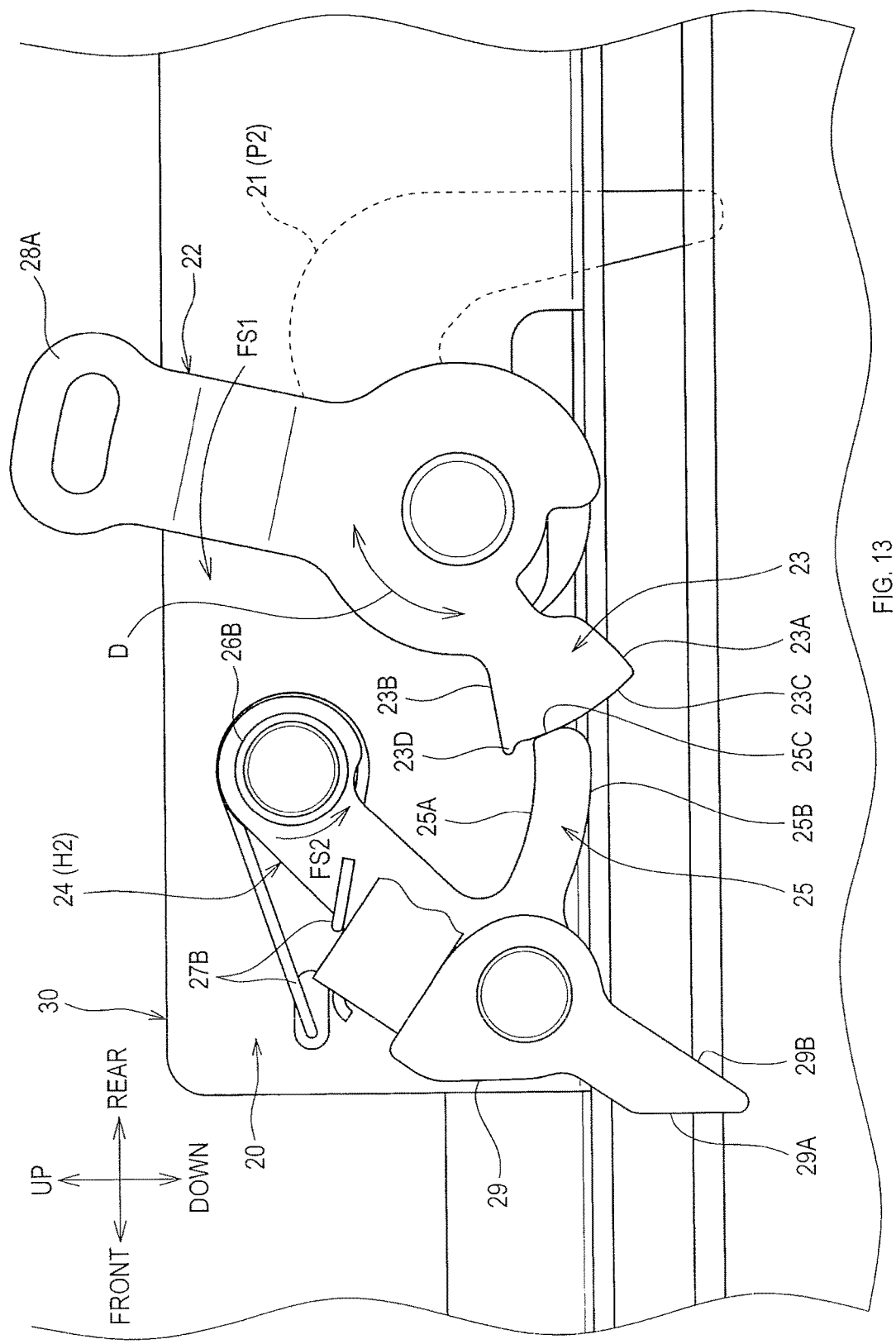
FIG. 13 is a diagram explaining operation of the return mechanism, showing a locking position.

The lock lever 24 is displaceable between a first retaining position H1 (see FIGS. 10 and 14) and a second retaining position H2 (see FIGS. 11 and 13). The first retaining position H1 is a position retaining the first operating lever 21 in the first position P1 (lock spring 7 is released). The second retaining position H2 is a position retaining the first operating lever 21 in the second position P2 (lock spring 7 is locked).

Specifically, the lock lever 24 is rotatably supported by a second rotating shaft 26B. The second rotating shaft 26B has a second rotation center axis L2 (hereinafter referred to as a second axis L2), which is parallel to the first axis L1.

As shown in FIG. 11, the lock lever 24 comprises, at a position separated from the second rotating shaft 26B along a radial line L3, a second locking protrusion 25. The second locking protrusion 25 protrudes in a direction intersecting with the radial line L3 and with the first axis L1 (see FIG. 12), and is rotationally displaced about the second axis L2 integrally with an arm 24A.

In other words, the lock lever 24 comprises the arm 24A extending from the second rotating shaft 26B (the second axis L2) along the radial line L3, and the second locking protrusion 25 protruding from an extending-direction leading end side of the arm 24A.

A second spring 27B exerts a second elastic force FS2 that rotates the lock lever 24 toward the first operating lever 21. Thus, the second elastic force FS2 applies, to the lock lever 24, a force that causes a leading end 25C of the second locking protrusion 25 approach the first rotating shaft 26A.

As shown in FIG. 12, coupled to the arm 24A is a second coupler 28B to which a second control cable (not shown) is coupled. The second control cable is to be operated by a user.

When the second control cable is pulled, the lock lever 24 rotates in a "direction causing the leading end of the second locking protrusion 25 to be spaced apart from the first rotating shaft 26A", and an amount of elastic deformation of the second spring 27B is increased. This causes the second spring 27B to slightly increase the second elastic force FS2.

As shown in FIG. 10, a return lever 29 is provided to a leading end of the arm 24A. The return lever 29 causes the first operating lever 21 placed in the first position P1 to return to the second position P2.

As shown in FIG. 12, the return lever 29 of the present embodiment is rotationally mounted to the leading end of the arm 24A via a third rotating shaft 26C. One axial end of the third rotating shaft 26C is fixed to the arm 24A by a fixing method, such as caulking.

The other axial end of the third rotating shaft 26C is mounted to the return lever 29 so as to allow the return lever 29 to be rotatable. The third rotating shaft 26C comprises, at the other axial end thereof, a flange 26E of an umbrella-like shape (see FIG. 11) constituting a fall-off inhibitor for the return lever 29.

The flange 26E is formed integrally with the third rotating shaft 26C. The flange 26E is formed by plastic working. Central axes of the first rotating shaft 26A to the third rotating shaft 26C are parallel to one another and are substantially parallel to a horizontal axis perpendicular to a longitudinal axis of the movable rail 5.

Assuming that "a position of the return lever 29 with respect to the arm 24A" shown in FIG. 10 is a reference position, the return lever 29 can be rotationally displaced in one direction with respect to the reference position, and cannot be rotated in the other direction with respect to the reference position.

Specifically, the return lever 29 is rotatable from the reference position in a "direction of displacement at returning (counterclockwise in FIG. 10)", and is not rotatable from the reference position in a "direction of displacement at walk-in (clockwise in FIG. 10)".

The "direction of displacement at walk-in" refers to a direction in which the movable rail 5 slides when the movable rail 5 shifts from an unslidable state to a slidable state by the "walk-in sliding function". The "direction of displacement at returning" refers to an opposite direction of the "direction of displacement at walk-in". In the present embodiment, the "direction of displacement at walk-in" corresponds to a direction toward a seat front side (hereinafter simply referred to as a front side), and the "direction of displacement at returning" corresponds to a direction toward a seat rear side (hereinafter simply referred to as a rear side).

When a force to rotate the return lever 29 in the "direction of displacement at walk-in" acts on the return lever 29, the return lever 29 is rotationally displaced in the "direction of displacement at walk-in" integrally with the lock lever 24, that is, with the second locking protrusion 25, as shown in FIG. 11.

When the second control cable is pulled, the lock lever 24 is rotationally displaced in the "direction of displacement at walk-in"; thus, the return lever 29 is also rotationally displaced in the "direction of displacement at walk-in" together with the lock lever 24.

A third spring 27C shown in FIG. 12 exerts a third elastic force FS3 directed to a direction causing the return lever 29 to return toward the reference position. Thus, even when the return lever 29 rotates in the "direction of displacement at returning", the return lever 29 returns to the reference position by the third elastic force FS3.

The return lever 29 of the present embodiment is pressed against the second coupler 28B by the third spring 27C so as to be retained in the reference position, and is restricted from being rotationally displaced from the reference position in the "direction of displacement at walk-in".

In a leading end side of the return lever 29, a front-side end face 29A positioned on the side of the "direction of displacement at walk-in", that is, on the front side, is inclined with respect to a rear-side end face 29B positioned on the side of the "direction of displacement at returning", that is, on the rear side.

Specifically, as shown in FIG. 10, in a reference state in which the return lever 29 is in the reference position with respect to the lock lever 24 placed in the first retaining position H1, the front-side end face 29A is inclined with respect to a movement axis of the movable rail 5.

Figure 16:
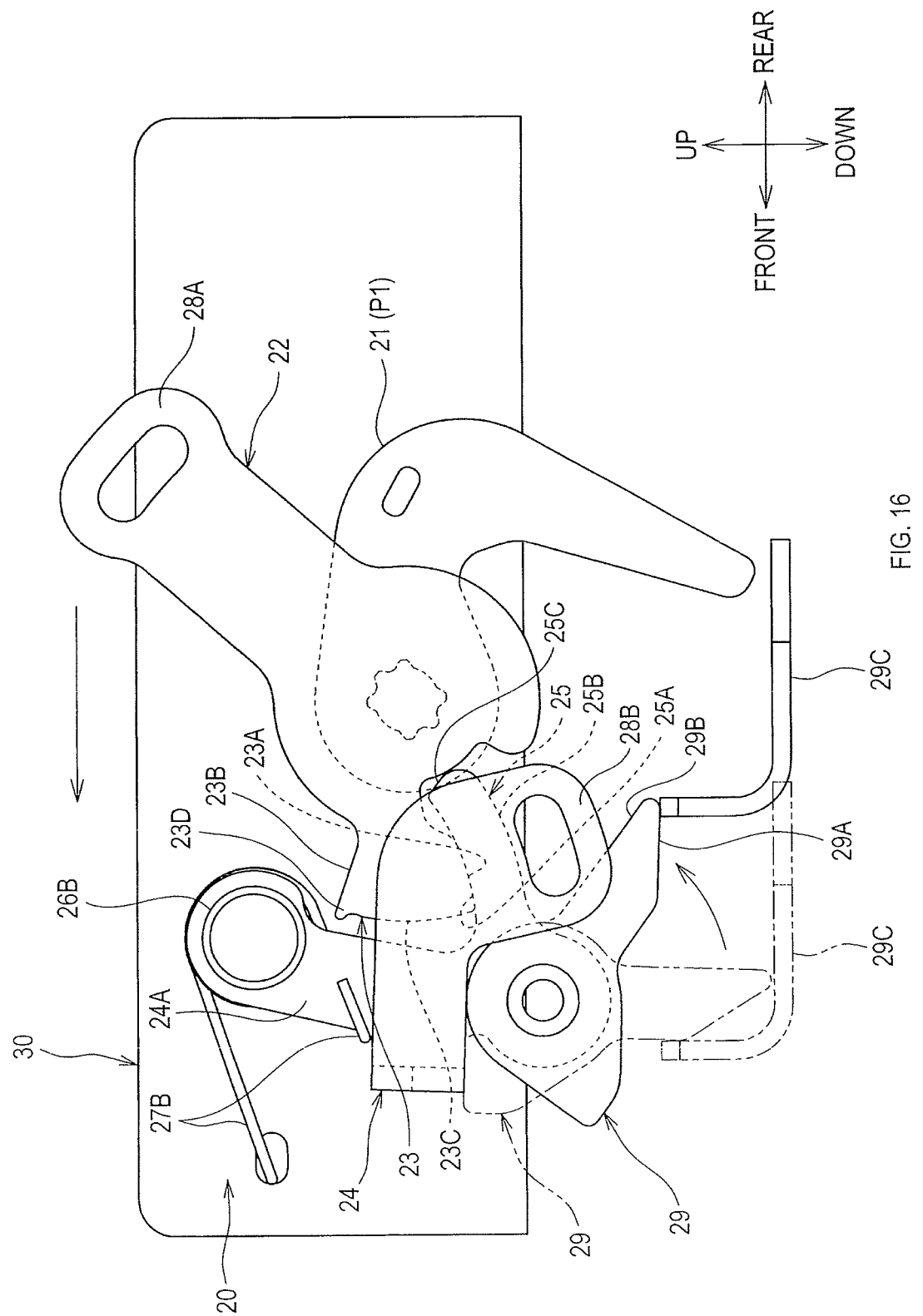
FIG. 16 is a diagram explaining operation of a return level and so on of the return mechanism.
Figure 17:
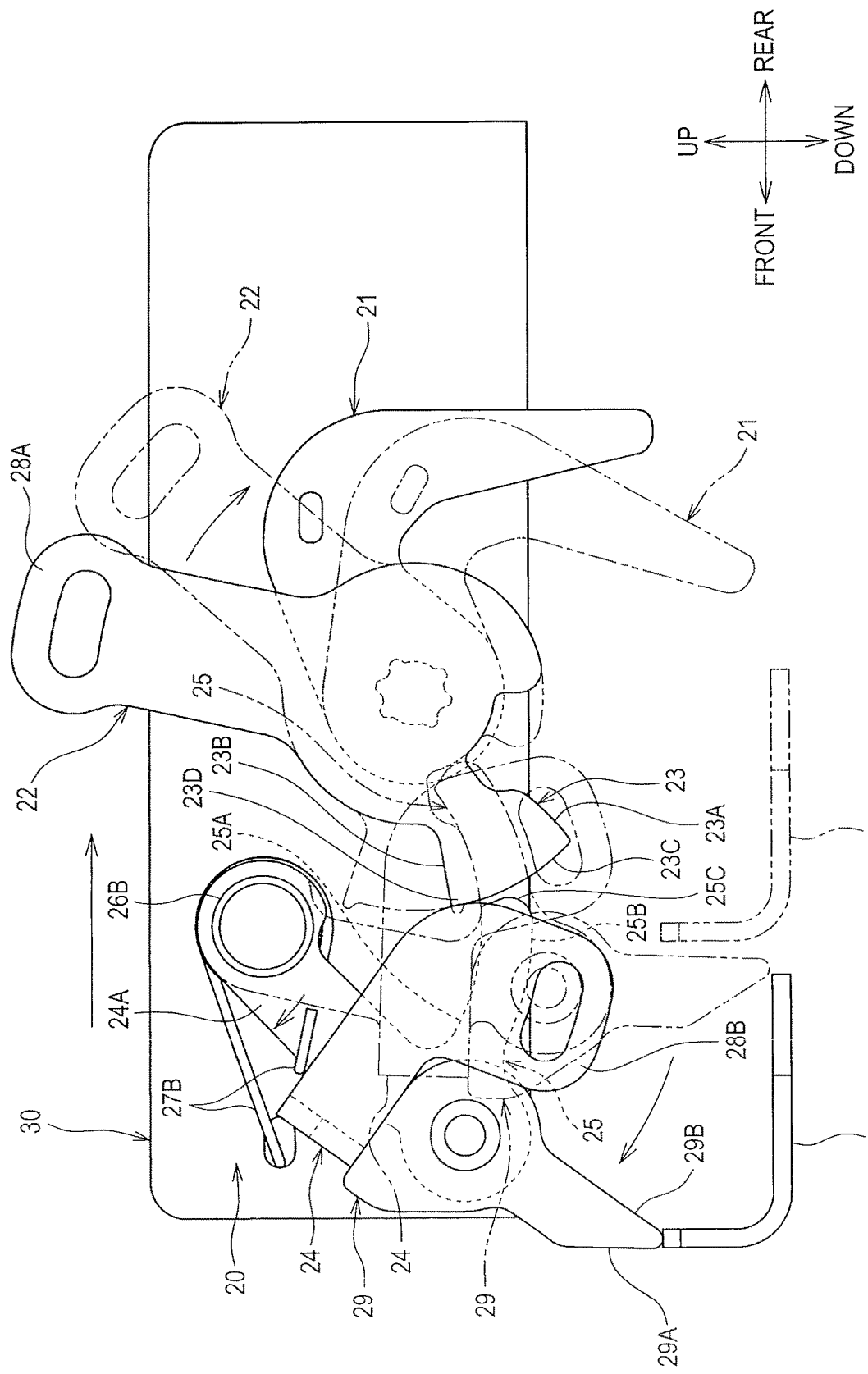
FIG. 17 is a diagram explaining operation of the return level and so on of the return mechanism.

In the reference state, the rear-side end face 29B is substantially perpendicular to the movement axis of the movable rail 5. As shown in FIG. 16, a return plate 29C is fixed to the fixed rail 3 or a vehicle floor. The return plate 29C can touch and come in contact with the leading end side of the return lever 29, that is, with the front-side end face 29A or the rear-side end face 29B.

Specifically, when the movable rail 5 is slidingly displaced by the "walk-in sliding function", the front-side end face 29A or the rear-side end face 29B comes in contact with the return plate 29C.

(a) When the lock lever 24 is in the first retaining position H1 and also the return lever 29 comes in contact with the return plate 29C from the rear side, the following occurs.

The front-side end face 29A comes in contact with the return plate 29C, and the return lever 29 is thereby rotationally displaced in the "direction of displacement at returning", that is, toward the rear side. Then, when the leading end side of the arm 24A is fully spaced apart from the return plate 29C, the return lever 29 returns to the reference position by the third elastic force FS3.

(b) When the lock lever 24 is in the first retaining position H1 and also the return lever 29 comes in contact with the return plate 29C from the front side, the following occurs.

The rear-side end face 29B comes in contact with the return plate 29C, and the return lever 29 is thereby pressed in the "direction of displacement at walk-in", that is, toward the front side. This causes the arm 24A, that is, the lock lever 24, to rotate toward the front side integrally with the return lever 29, resulting in rotational displacement of the lock lever 24 toward the second retaining position H2.

3.2 Operation of Return Mechanism

<Retainment of Locking Position>

When the seat S is in a state allowing a passenger or other person to sit down on it, that is, in the unslidable state, the first operating lever 21 is in the second position P2, the lock portion 71 is in the locking position R2, and the lock lever 24 is in the second retaining position H2, as shown in FIG. 13.

When a first end contact portion 23C of the first locking protrusion 23 and a second end contact portion 25C of the second locking protrusion 25 come in contact with each other, the unslidable state occurs, that is, the first operating lever 21 is retained in the second position P2.

Figure 18:
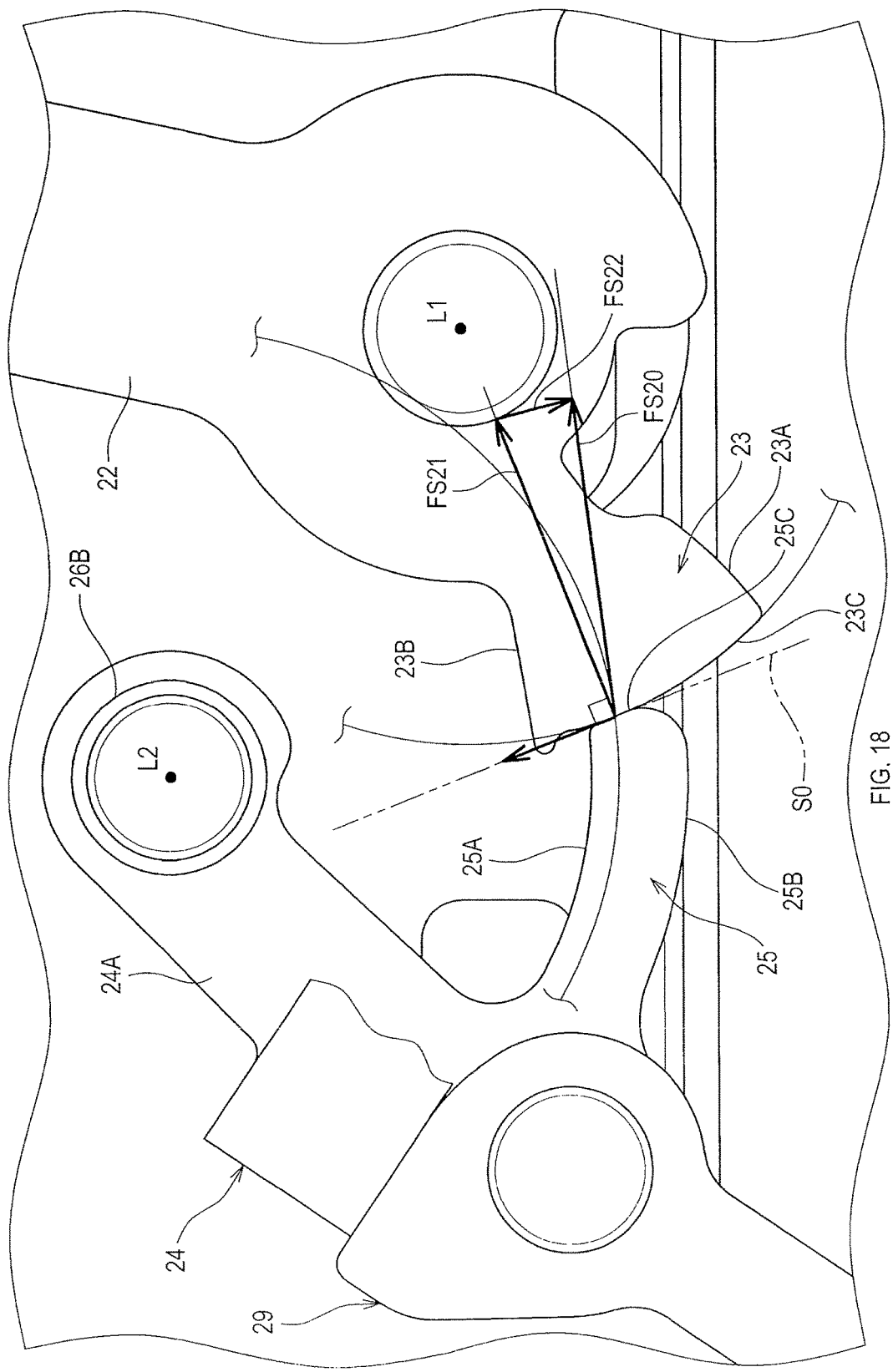
FIG. 18 is a diagram explaining operation of the return mechanism, showing a locking position.

Specifically, as shown in FIG. 18, the first end contact portion 23C is configured with a curved surface that is curved substantially along an arc centered on the first axis L1 of the first operating lever 21. A part of the second end contact portion 25C in contact with the first end contact portion 23C substantially corresponds to a virtual tangential plane S0.

The virtual tangential plane S0 is a virtual tangential plane with respect to the first end contact portion 23C in an area of contact between the first end contact portion 23C and the second end contact portion 25C in the case where the second end contact portion 25C is in contact with the first end contact portion 23C.

The first locking protrusion 23 is subjected to a component force FS22. Specifically, a force FS20 is generated by the second elastic force FS2. A component force FS21 is a component force, in the force FS20, directed toward the first axis L1. The component force FS22 is a component force, in the force FS20, directed perpendicular to the component force FS21.

The second locking protrusion 25 cannot move in a direction in which a distance from the second axis L2 changes, that is, along the radial line L3. Thus, when the second end contact portion 25C is in contact with the first end contact portion 23C, the second end contact portion 25C, that is, the second locking protrusion 25, cannot move in a direction of the component force FS22 (downward, in FIG. 18).

Accordingly, the first end contact portion 23C and the second end contact portion 25C contact each other while the first end contact portion 23C is pressed against the second end contact portion 25C; thus, the first locking protrusion 23, that is, the first operating lever 21, is retained in the second position P2.

<Retainment of Non-Locking Position>

When the lock lever 24 is in the second retaining position 1-12 and also, for example, the first control cable is pulled, the second operating lever 22 rotates in association with that. As a result, the first operating lever 21 is rotationally displaced toward the first position P1, while the second end contact portion 25C is in sliding contact with the first end contact portion 23C.

Figure 14:
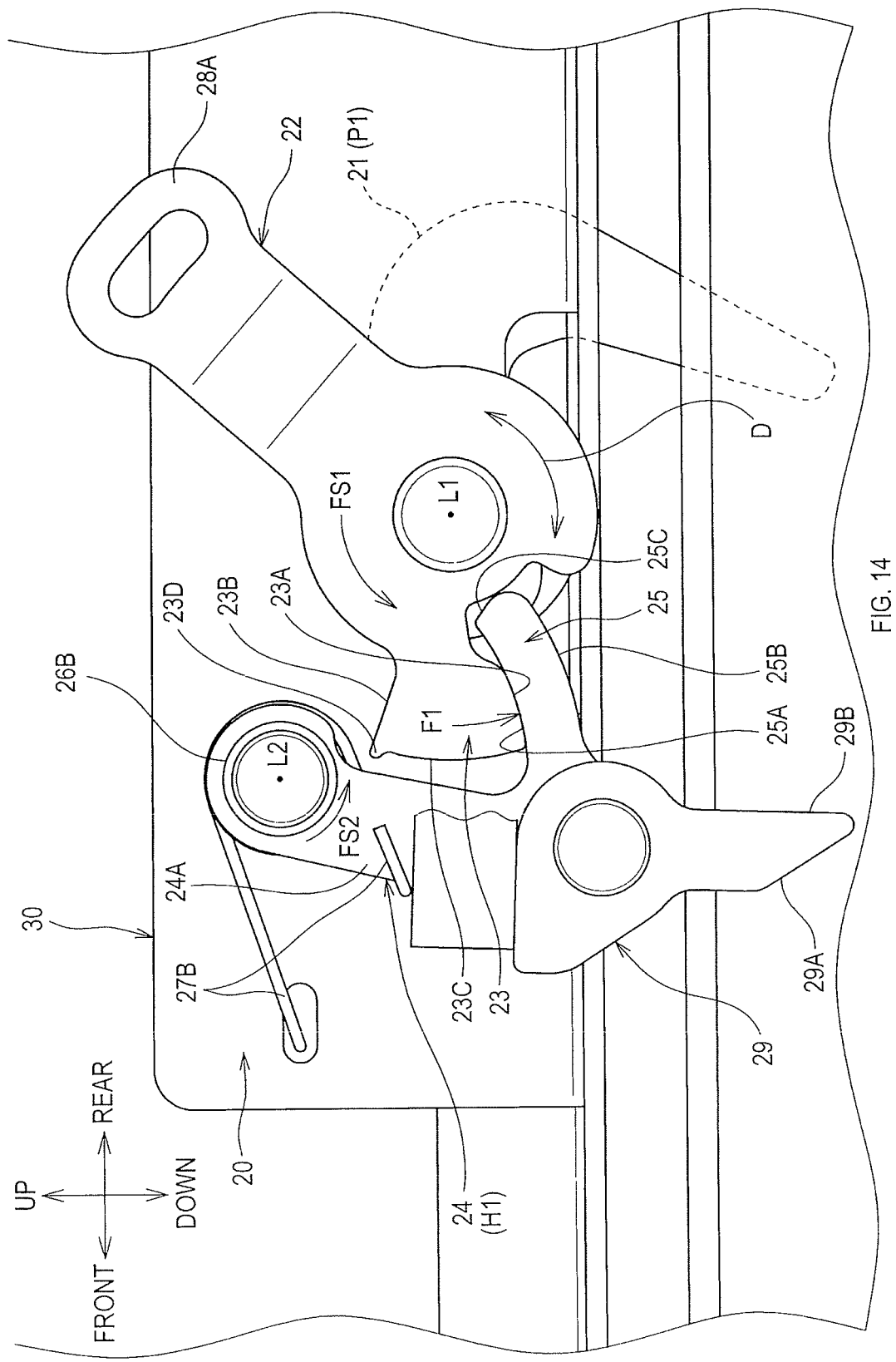
FIG. 14 is a diagram explaining operation of the return mechanism, showing a non-locking position.

Then, when the second end contact portion 25C is spaced apart from the first end contact portion 23C, as shown in FIG. 14, a first contact surface 23A of the first locking protrusion 23 and a second contact surface 25A of the second locking protrusion 25 come in contact with each other, and the first operating lever 21 is retained in the first position P1.

Specifically, when the first contact surface 23A is in contact with the second contact surface 25A, the first contact surface 23A, that is, the first locking protrusion 23, is subjected to a force (hereinafter referred to as a restoring force F1) to rotate toward the second position P2 by the first elastic force FS1 of the first spring 27A.

Since the second locking protrusion 25 protrudes in the direction intersecting with the radial line L3 and with the first axis L1, even when the restoring force F1 acts on the second contact surface 25A, the second locking protrusion 25 is not displaced in the direction of the restoring force F1.

Accordingly, neither the first locking protrusion 23 nor the second locking protrusion 25 is displaced; thus, the first operating lever 21 is retained in the first position P1 and the lock lever 24 is retained in the first retaining position H1.

When the lock lever 24 is retained in the first retaining position H1 and also the second control cable is pulled, the lock lever 24 rotates toward the second retaining position H2, and the second locking protrusion 25 is spaced apart from the first locking protrusion 23. Thus, the first operating lever 21 returns to the second position P2 by the first elastic force FS1 of the first spring 27A.

Then, when the second end contact portion 25C comes in contact with the first end contact portion 23C, a state shown in FIG. 13 is restored. Specifically, the first operating lever 21 is placed in the second position P2, and the lock lever 24 is retained in the second retaining position 112.

Assuming that directions parallel to rotating directions of the first operating lever 21 are referred to as operating directions D, the first contact surface 23A is a side face on one side in the operating directions D among the side faces of the first locking protrusion 23. Specifically, of the two side faces of the first locking protrusion 23 lined in the operating directions D, the first contact surface 23A is a part that is in contact with the second locking protrusion 25 in the non-locking position R1.

The second contact surface 25A is a side face on one side along the radial line L3 among the side faces of the second locking protrusion 25. Specifically, of the two side faces of the second locking protrusion 25 lined along the radial line L3, the second contact surface 25A is a part in contact with the first locking protrusion 23 in the non-locking position R1.

The second contact surface 25A is configured with a curved surface that is curved substantially along an arc centered on the second axis L2. The first contact surface 23A is configured with a curved surface that is curved substantially along an arc centered on the second axis L2 when in contact with the second contact surface 25A.

In the present embodiment, a side face 25B, which is opposite the second contact surface 25A, of the two side faces of the second locking protrusion 25 lined along the radial line L3, is also configured with a curved surface that is curved substantially along an arc centered on the second axis L2.

Figure 15:
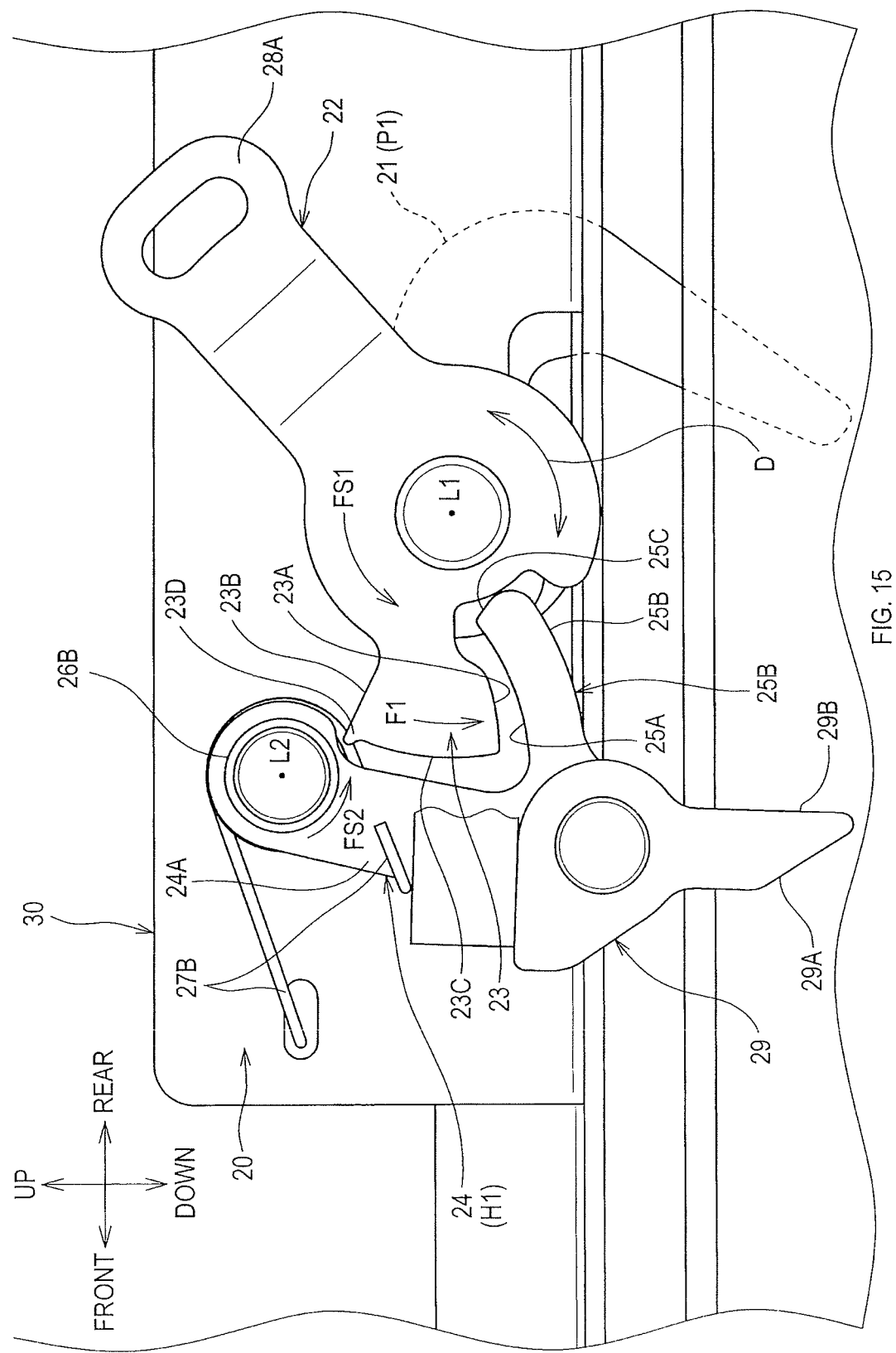
FIG. 15 is a diagram explaining operation of the return mechanism.

As shown in FIG. 15, a protrusion 23D is provided to a side face 23B, which is opposite the first contact surface 23A, of the two side faces of the first locking protrusion 23 lined in the operating directions D. The protrusion 23D inhibits the second end contact portion 25C from being disengaged from the first end contact portion 23C when the first operating lever 21, the second operating lever 22, the lock lever 24, and so on are mounted to the base member 30.

4. Characteristics of Sliding Device of the Present Embodiment

The sliding device 1 is configured such that, when the first contact surface 23A and the second contact surface 25A are in contact with each other, the first operating lever 21 is retained in the first position P1 as shown in FIG. 14, and such that, when the first end contact portion 23C and the second end contact portion 25C are in contact with each other, the first operating lever 21 is retained in the second position P2 as shown in FIG. 13.

This enables the second locking protrusion 25 to come closer to the first locking protrusion 23 along an axis substantially parallel to a protruding direction of the first locking protrusion 23 (see FIG. 14). In other words, the second contact surface 25A is in sliding contact with the first contact surface 23A along the axis substantially parallel to the protruding direction, so that the second locking protrusion 25 is locked with respect to the first locking protrusion 23.

Thus, the second locking protrusion 25 can contact the first locking protrusion 23 either from a clockwise direction or from a counterclockwise direction and be locked with respect to the first locking protrusion 23.

Specifically, in the present embodiment, when the first operating lever 21 rotates counterclockwise, the side face 23A of the first locking protrusion 23 constitutes a first contact surface, and the side face 25A of the second locking protrusion 25 constitutes a second contact surface.

Figure 19:
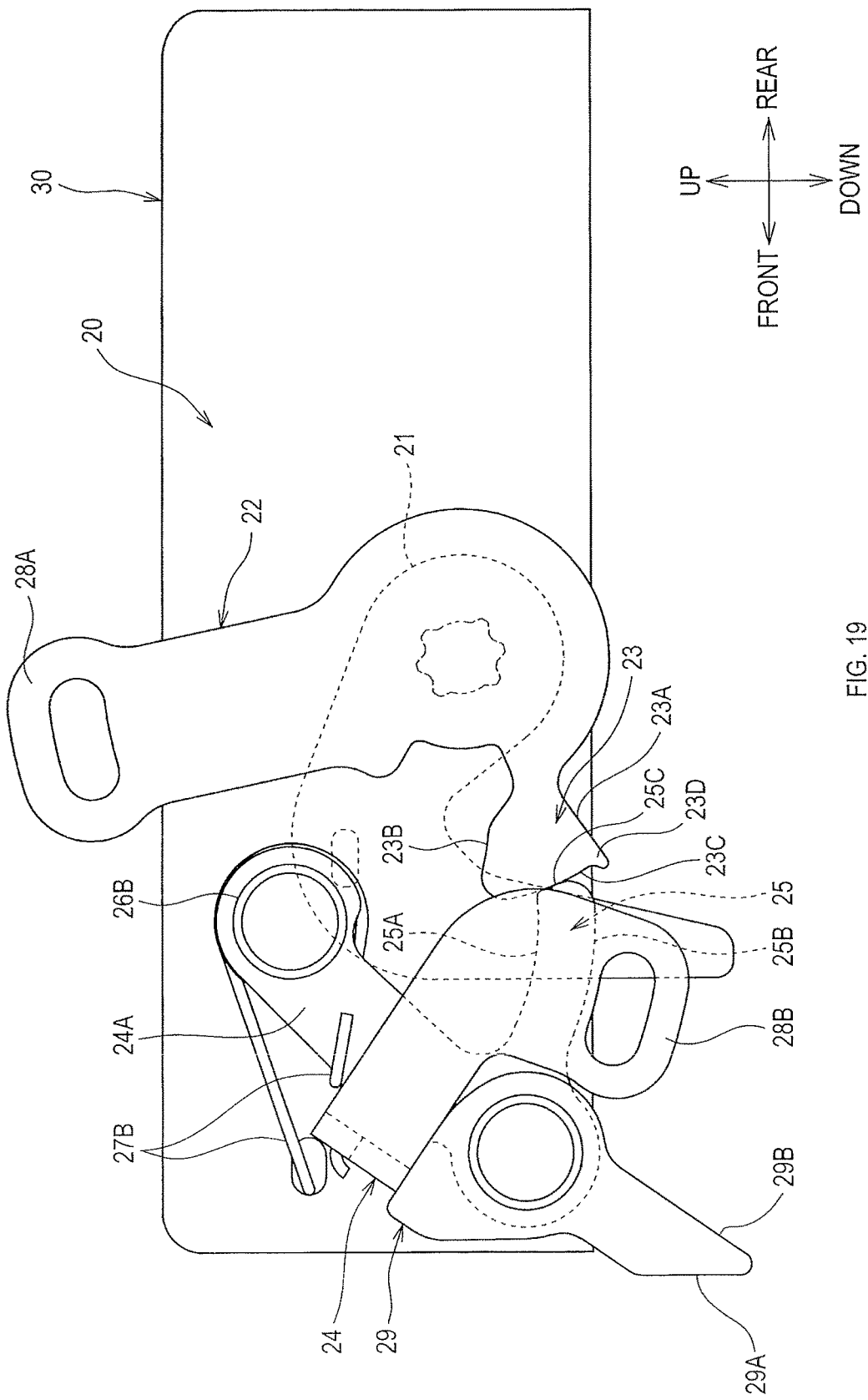
FIG. 19 is a view showing characteristics of the return mechanism, showing an example of a case in which a first operating lever rotates clockwise.

Assuming that the first operating lever 21 rotates clockwise, as shown in FIG. 19, the side face 23B of the first locking protrusion 23 constitutes the first contact surface, and the side face 25B of the second locking protrusion 25 constitutes the second contact surface. Contact between the first contact surface 23B and the second contact surface 25B allows the first operating lever 21 to be retained in the first position P1.

In the case where the first operating lever 21 rotates clockwise, it is desirable that the side face 25B of the second locking protrusion 25, which is the second contact surface, be a curved surface that is curved substantially along an arc centered on the second axis L2.

Accordingly, in the present embodiment, in whichever direction the first operating lever 21 rotates, the first locking protrusion 23 can be locked with respect to the second locking protrusion 25; thus, the first operating lever 21 can be retained in the first position P1 regardless of the direction of rotation of the first operating lever 21.

Similarly, in whichever direction the first operating lever 21 rotates, the first end contact portion 23C and the second end contact portion 25C can contact each other; thus, the first operating lever 21 can be retained in the second position P2 regardless of the direction of rotation of the first operating lever 21.

The second contact surface 25A is the curved surface that is curved substantially along the arc centered on the second axis L2. This enables locking between the first locking protrusion 23 and the second locking protrusion 25 to be a smooth operation.

Further, the first contact surface 23A is configured with the curved surface that is curved substantially along the arc centered on the second axis L2 when in contact with the second contact surface 25A. Thus, a pressure angle when the first contact surface 23A and the second contact surface 25A come in contact with each other is 90 degrees.

This makes it possible to reliably inhibit occurrence of a trouble that the second contact surface 25A is slidingly displaced with respect to the first contact surface 23A by the elastic force of the first spring 27A and the second spring 27B.

The first end contact portion 23C is the curved surface that is curved substantially along the arc centered on the first axis L1. This makes it possible to permit rotational displacement of the first operating lever 21 while retaining the first operating lever 21 in the second position P2 (in other words, while the lock portion 71 is retained in the locking position R2).

A part of the second end contact portion 25C in contact with the first end contact portion 23C, that is, the second end contact portion 25C, substantially corresponds to the virtual tangential plane S0 with respect to the first end contact portion 23C at the part.

This makes it possible to inhibit unnecessary rotational displacement of the first locking protrusion 23 when the first operating lever 21 is rotationally displaced while retaining the first operating lever 21 in the second position P2 (in other words, while the lock portion 71 is retained in the locking position R2).

The front-side end face 29A of the return lever 29 is inclined with respect to the movement axis of the movable rail 5. This makes it possible to reliably rotate only the return lever 29 when the front-side end face 29A comes in contact with the return plate 29C. Thus, a situation can be inhibited in which movement of the movable rail 5 is blocked when the front-side end face 29A comes in contact with the return plate 29C.

The rear-side end face 29B of the return lever 29 is substantially perpendicular to the movement axis of the movable rail 5 in the reference state. This makes it possible, when the rear-side end face 29B comes in contact with the return plate 29C, to effectively convert the force acting on the return lever 29 at such contact into the moment that rotates the lock lever 24.

(Other Embodiments)

The first contact surface 23A and the second contact surface 25A of the above-described embodiment are each configured with the curved surface that is curved in the arc-like shape centered on the second axis L2. However, the present disclosure is not limited to this.

Specifically, for example, the second contact surface 25A may be configured with a plane that becomes a tangential plane of the first contact surface 23A in the state where the first contact surface 23A and the second contact surface 25A are in contact with each other.

The first end contact portion 23C of the above-described embodiment is configured with the curved surface that is curved in the arc-like shape centered on the first axis L1. However, the present disclosure is not limited to this.

For example, a configuration may be adopted in which the first end contact portion 23C and the second end contact portion 25C become planes parallel to each other in the state where the first end contact portion 23C and the second end contact portion 25C are in contact with each other.

In the above-described embodiment, the second end contact portion 25C is configured with a plane substantially corresponding to the virtual tangential plane S0 with respect to the first end contact portion 23C. However, the present disclosure is not limited to this. For example, the second end contact portion 25C may be configured with a curved surface having an arc-like shape, whose radius of curvature is smaller than that of the first end contact portion 23C.

In the above-described embodiment, a vehicle seat for a passenger car is described as an example. However, the present disclosure is not limited to this. The present disclosure can also be applied to other automotive seats, or seats for use in other vehicles, such as railway vehicles, ships, and airplanes.

Further, in the present disclosure, at least two of the above-described embodiments may be combined together.

What is claimed is:

1. A sliding device that supports a vehicle seat in a slidable manner, the sliding device comprising:
    a fixed rail;
    a movable rail that is slidably mounted to the fixed rail and onto which the vehicle seat is fixed;
    a lock portion that is displaceable between a locking position restricting sliding of the movable rail and a non-locking position allowing the movable rail to slide;
    an operating lever that displaces the lock portion, the operating lever being rotationally dispaceable between a first position placing the lock portion in the non-locking position and a second position placing the lock portion in the locking position;
    a first locking protrusion protruding in a direction substantially perpendicular to a first axis of the operating lever, the first locking protrusion being rotationally displaced about the first axis simultaneously with the operating lever; and
    a lock lever comprising a rotating shaft having a second axis parallel to the first axis of the operating lever, the lock lever comprising a second locking protrusion at a position radially offset from the rotating shaft, wherein the second locking protrusion protrudes substantially in a direction intersecting with the first axis and being rotationally displaced about the second axis of the rotating shaft, wherein
    a side face on one side of the first locking protrusion is a first contact surface and a side face on one side of the second locking protrusion is a second contact surface, and
    the sliding device is configured such that, when the first contact surface and the second contact surface are in contact with each other, the operating lever is retained in one of the first position or the second position, and such that, when a protruding-direction end of the first locking protrusion and a protruding-direction end of the second locking protrusion are in contact with each other, the operating lever is retained in the other of the first position or the second position.

2. The sliding device according to claim 1,
    wherein the second contact surface is a curved surface that is curved substantially along an arc centered on the second axis of the rotating shaft.

3. The sliding device according to claim 1,
    wherein the protruding-direction end of the first locking protrusion is a curved surface that is curved substantially along an arc centered on the first axis of the operating lever.

4. The sliding device according to claim 3,
    wherein a part of the protruding-direction end of the second locking protrusion in contact with the protruding-direction end of the first locking protrusion substantially corresponds to a virtual tangential plane with respect to the protruding-direction end of the first locking protrusion at the part.

5. A return mechanism for a slidable device for a vehicle seat, the return mechanism comprising:
    an operating lever including an operating-lever protrusion, and configured to rotate about an operating-lever axis; and
    a lock lever including a lock-lever protrusion, and configured to rotate about a lock-lever axis, wherein
    the lock-lever axis is parallel with and non-colinear with the operating-lever axis,
    the lock-lever protrusion includes an arc-shaped upper surface substantially equidistant from the lock-lever axis such that a distance from the upper surface to the lock-lever axis is a first radius, and
    the lock-lever protrusion includes an arc-shaped lower surface substantially equidistant from the lock-lever axis such that a distance from the lower surface to the lock-lever axis is a second radius and such that the second radius is greater than the first radius.

6. The return mechanism of claim 5, further comprising:
    an operating-lever spring configured to rotate the operating lever counter-clockwise; and
    a lock-lever spring configured to rotate the lock lever counter-clockwise, wherein
    the protrusions are configured such that, in a non-locking position, the upper surface of the lock-lever protrusion supports a lower surface of the operating-lever protrusion, and
    the protrusions are configured such that, in a locking position, an end of the lock-lever protrusion contacts an end of the operating-lever protrusion.

7. The return mechanism of claim 6, further comprising:
    a push lever fastened to the operating lever through a first rotating shaft such that the push lever rotates synchronously with the operating lever, wherein
    the push lever extends substantially rearward and downward such that a clockwise rotation of the operating lever pushes a locking portion downward and unlocks the slidable device, and
    the operating-lever spring is configured to rotate the push lever counter-clockwise and to permit the locking portion to move upwards and to lock the slidable device.

8. The return mechanism of claim 7, wherein
    the operating lever includes an operating-lever coupler configured to be pulled by a first control cable to rotate the operating lever clockwise such that the push lever rotates clockwise and pushes the locking portion downward to unlock the slidable device, and
    the lock lever includes a lock-lever coupler configured to be pulled by a second control cable to rotate the lock lever clockwise to permit the operating lever to rotate counter-clockwise such that the push lever rotates counter-clockwise and permits the locking portion to move upwards and to lock the slidable device.

9. The return mechanism of claim 8, wherein
the operating-lever protrusion includes a protruding tip extending frontward from an upper corner of an end surface.

10. The return mechanism of claim 7, further comprising:
a base member configured to support the levers,
a first sleeve covering the first rotating shaft and passing through the base member,
a second rotating shaft attached to the base member and attached to a first end of an arm of the lock lever, wherein the second rotating shaft rotates about the lock-lever axis,
a third rotating shaft attached to a second end of the arm, wherein the third rotating shaft rotates about a return-lever axis,
a return lever attached to the third rotating shaft, and
a return-lever spring configured to rotate the return lever counter-clockwise about the return-lever axis.

11. The return mechanism of claim 5, further comprising:
an operating-lever spring configured to rotate the operating lever clockwise; and
a lock-lever spring configured to rotate the lock lever counter-clockwise, wherein
the protrusions are configured such that, in a non-locking position, an end of the lock-lever protrusion contacts an end of the operating-lever protrusion, and,
the protrusions are configured such that, in a locking position, an upper surface of the operating-lever protrusion supports the lower surface of the lock-lever protrusion.

12. The return mechanism of claim 11, wherein
the operating lever protrusion includes a protruding tip extending frontward from a lower corner of an end surface.

\* \* \* \* \*